United States Patent
Takeshita et al.

(10) Patent No.: US 6,911,802 B2
(45) Date of Patent: Jun. 28, 2005

(54) BATTERY PACK

(75) Inventors: Toshio Takeshita, Kanagawa (JP); Hisashi Aoki, Aichi (JP); Kei Tashiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 59 days.

(21) Appl. No.: 10/416,614

(22) PCT Filed: Sep. 13, 2002

(86) PCT No.: PCT/JP02/09469

§ 371 (c)(1),
(2), (4) Date: Nov. 4, 2003

(87) PCT Pub. No.: WO03/026041

PCT Pub. Date: Mar. 27, 2003

(65) Prior Publication Data

US 2004/0070366 A1 Apr. 15, 2004

(30) Foreign Application Priority Data

Sep. 14, 2001 (JP) .................................. 2001-279443

(51) Int. Cl.⁷ ............................. H02J 7/00; H01M 2/10
(52) U.S. Cl. ........................................ 320/107; 429/99
(58) Field of Search ................................ 320/107, 110, 320/112, 113; 429/97, 99, 100

(56) References Cited

U.S. PATENT DOCUMENTS 6,485,861 B2 * 11/2002 Takeshita et al. ............. 429/99
6,636,016 B2 * 10/2003 Tanaka et al. ............... 320/107

FOREIGN PATENT DOCUMENTS

| JP | 8-17412 | 1/1996 |
| JP | 9-27306 | 1/1997 |
| JP | 10-340710 | 12/1998 |
| JP | 11-45689 | 2/1999 |

* cited by examiner

*Primary Examiner*—Pia Tibbits
(74) *Attorney, Agent, or Firm*—Frommer Lawrence & Haug LLP; William S. Frommer

(57) ABSTRACT

An object of the present invention is to secure a space in a battery case to house battery cells or minimum gaps to allow swelling of battery cells, so that the battery cells can be held in the battery case without play.

A battery pack 1 connects in series and house a plurality of square pole-like battery cells 3 in a battery case 3, the plurality of battery cells each having a battery lid 32 positioned at the front side thereof, wherein a negative pole side tab 37 that is connected to a battery can bottom 35 of a battery cell and extends to the battery lid side, an intermediate connection tab 36 connecting a positive side pole of the battery cell to a battery can bottom of adjacent another battery cell and a positive pole side tab 34 connected to a positive pole terminal part of said another battery cell are provided, and a cell side insulating sheet 50 is provided between the respective negative pole side tab, intermediate connection tab and the sides of respective battery cans 31, and a projecting tab for pressing side edge parts 3E extending in the front and back direction of the respective battery cells, upper corner ribs 13, small ribs 21 and lower corner ribs 22 (side edge pressing part) are respectively provided on the inner face of the upper side case and on the inner face of the lower side case.

5 Claims, 16 Drawing Sheets

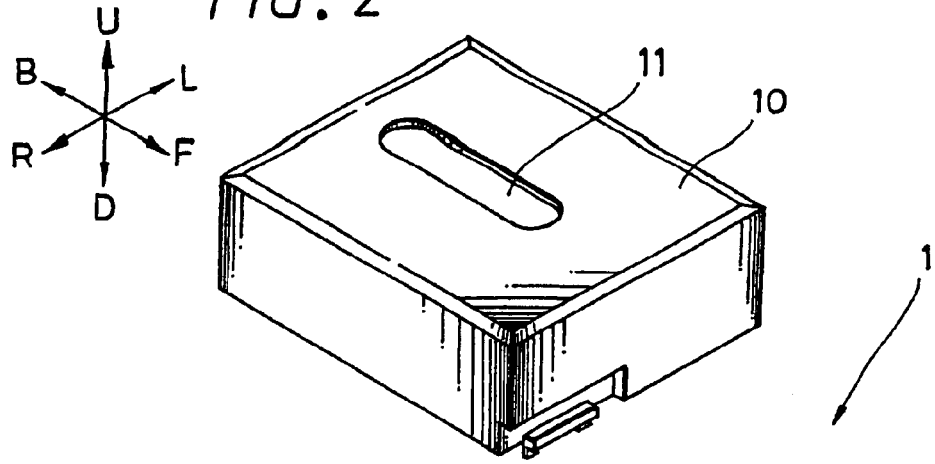
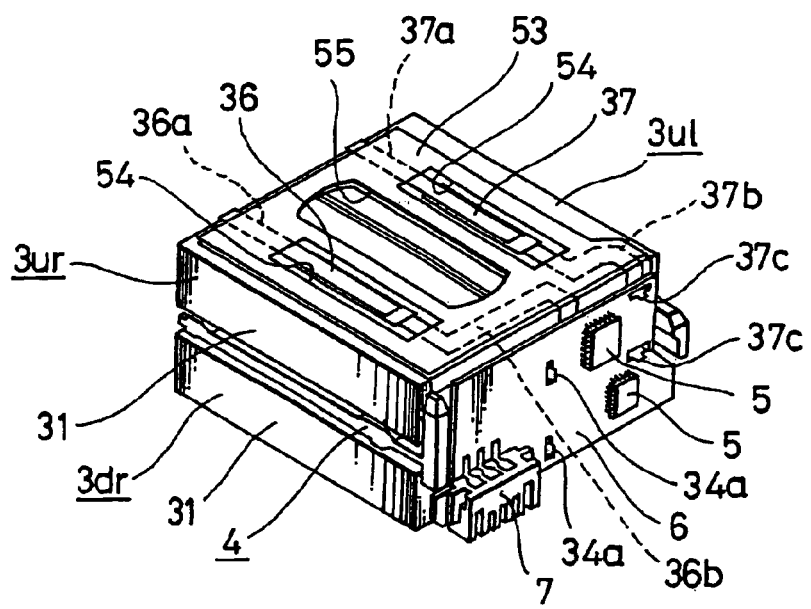
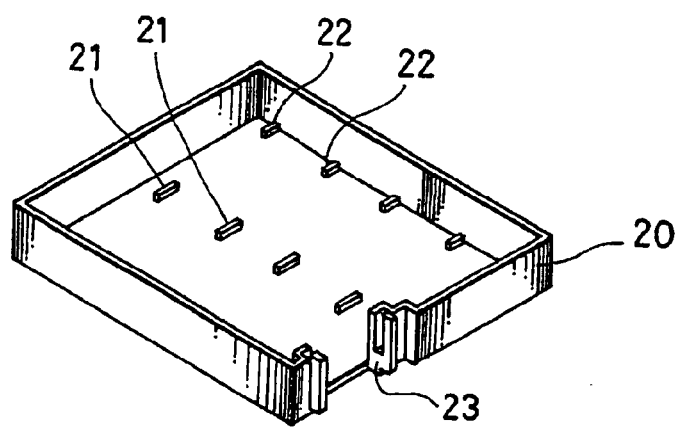
FIG. 2

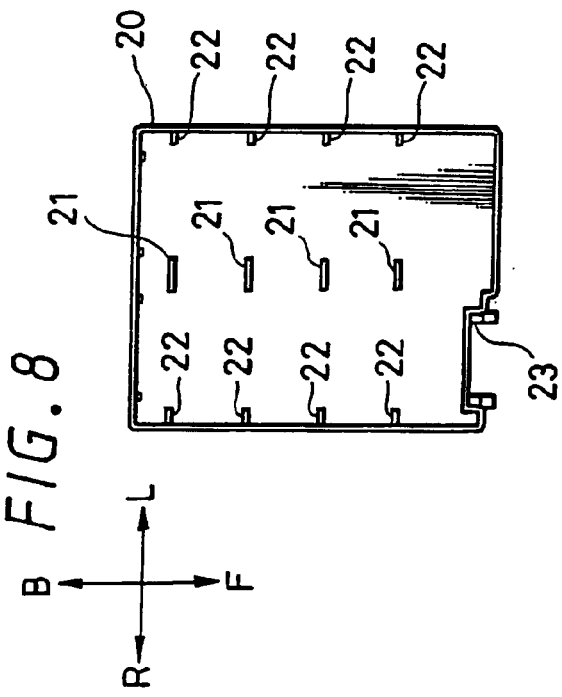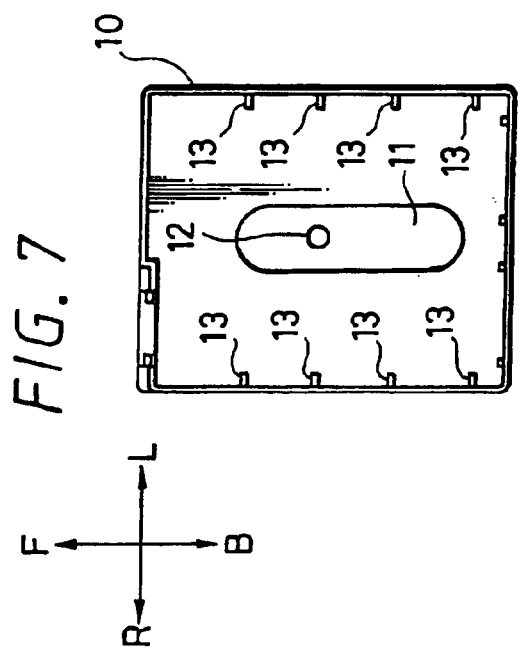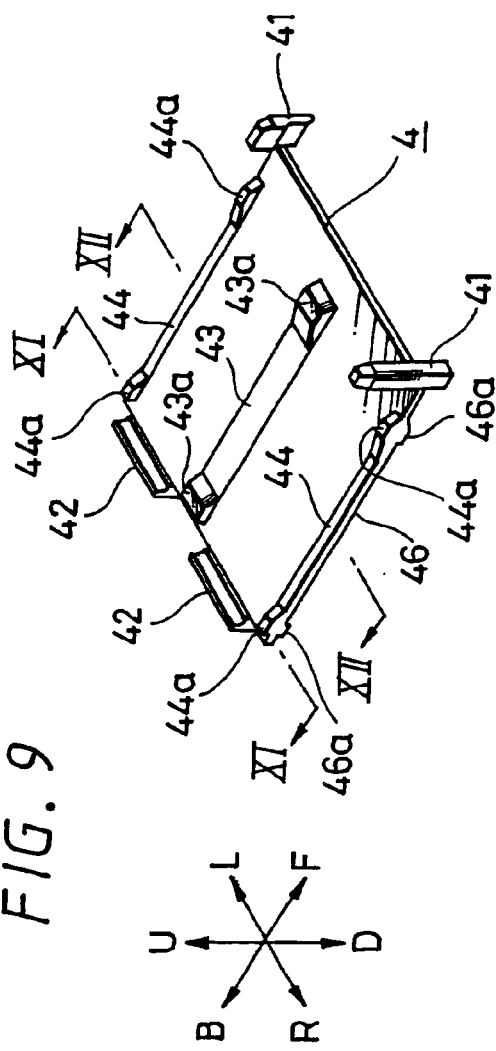

Unit: mm

BATTERY PACK

TECHNICAL FIELD

The present invention relates to a battery pack housing a plurality of square pole-like battery cells in a battery case, and particularly to maintaining the stable state of housing the battery cells in the battery case.

BACKGROUND ART

A battery pack is used with various kinds of electronic appliances as a battery that is capable of being charged, and such battery pack houses one or a plurality of battery cells in a battery case.

There are some battery cells that are of a flat square pole in shape, and it is efficient in terms of space for these battery cells to be housed in a square pole-like battery case that is one size larger than the battery cell.

In addition, the battery pack is provided with a negative pole side tab creeping over the side of a battery can from the battery can bottom to the battery can lid side in order to provide a battery terminal at one end of the battery pack or in a region in the direction of one end thereof.

Further, in the case where a plurality of battery cells are connected in series, an intermediate connection tab is provided for connecting the battery can bottom with a positive pole terminal part of adjacent another battery cell, and the intermediate connection tab is provided to creep over the side of the battery can as does the above-mentioned negative pole side tab.

Meanwhile, when these negative pole side tab and intermediate connection tab are disposed creeping over the side of the battery can, there is interposed an insulation sheet in-between.

In addition, there are provided some battery packs in which the above-mentioned negative pole side tab and the intermediate connection tab are respectively divided in two, and PTC (positive temperature coefficient) is interposed between these divided tab piece and tab piece so as to break supply of electric power when the temperature of the battery cell becomes high.

Further, with the square pole-like battery cell, the central portion of a rectangle tends to bulge out at a time of the battery cell being charged.

Because of the above-mentioned fact, the battery case needs to be formed to be one or two size as large as the outer shape of the battery cell.

However, in the case where the battery case is formed larger than the battery cell, there occurs a problem in which the battery cell become wobbly in the inside thereof.

When the battery cell becomes wobbly in the battery case, the above-mentioned negative pole side tab and the positive pole side tab that are connected to the battery terminal repeat deformation that leads to a trouble in which these tabs are damaged as the battery terminal is conventionally fixed to the battery case.

In addition, when the battery cell become wobbly, the above-mentioned negative pole side tab and the intermediate connection tab move and shift from the insulation sheet, resultantly leading to a trouble such as a short circuit of power.

DISCLOSURE OF THE INVENTION

An object of a battery pack of the present invention is to secure a space in a battery case for housing battery cells as well as gaps to allow minimum swelling of a negative pole tab and an intermediate connection tab so as to prevent the housed battery from becoming wobbly.

The battery pack of the present invention is a battery pack for housing in a battery case a plurality of square pole-like battery cells by connecting them in series; the battery case being comprised of an upper case and a lower case, respectively in box shape, in such a fashion that they are combined with each other; the plurality of battery cells, each having a battery lid positioned on the front side, being housed side by side in the left and right direction in the above-mentioned battery case, comprising a negative pole side tab that is connected to the battery can bottom of a battery cell and extends to the battery lid side, an intermediate connection tab that connects a positive pole terminal part of the negative pole cell with the battery can bottom of adjacent another battery cell and a positive pole side tab connected to a positive pole terminal part of said another battery cell, with the abovementioned negative pole side tab and intermediate connection tab being disposed both creeping over the sides of the respective battery cells and being divided into two of a can bottom side tab and a battery lid side tab, respectively. And PTC (positive temperature coefficient) is interposed between these can bottom side tab and battery lid side tab and a cell side insulating sheet is provided between the respective negative side tabs, intermediate connection tabs and the sides of the respective battery cans, with side edge pressing parts for pressing side edge portions extending in the front and back direction of the respective battery cells being respectively provided on the inner face of the upper case and on the inner face of the lower case when the upper case and lower case are combined with each other.

Therefore, according to a battery pack of the present invention, since side edge pressing parts for pressing side edge portions extending in the front and left direction of battery cells are provided in a battery case, it is possible to hold the battery cells in the way that the battery cells do not become wobbly when they are housed in the battery case, and at the same time, since a predetermined gaps are formed between the central portions of the battery cells housed in the battery case and a separator so that when the central portions of the upper surface and under surface of the battery case bulge out due to swelling of the battery cells at a time of the battery pack being charged, the above-mentioned gaps can absorb the amount of bulging, it is possible to prevent the whole of the battery case from swelling and deforming.

BRIEF DESCRIPTION OF THE DRAWINGS

FIG. 2 is a perspective view of a battery case being exploded up and down;

FIG. 7 is a bottom view of an upper side case;

FIG. 8 is a plan view of a lower side case;

FIG. 9 is a perspective view of the separator obliquely seen from the upper front direction;

BEST MODE FOR CARRYING OUT THE INVENTION

Figure 1:
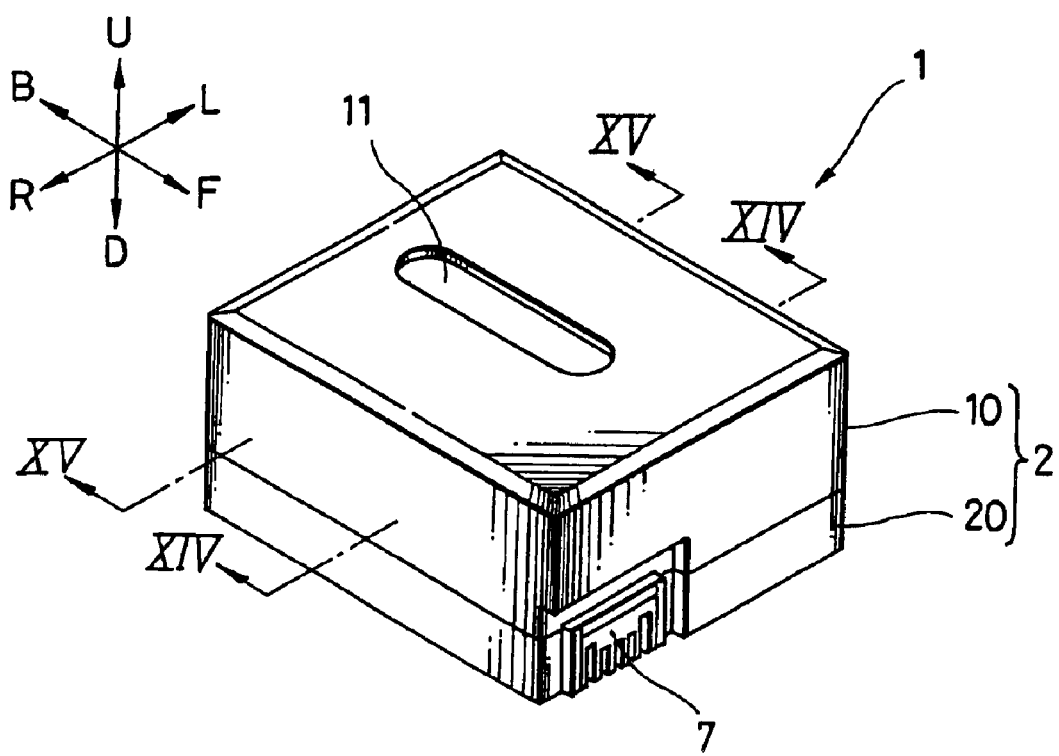
FIG. 1 is a perspective view of the whole of a battery pack, showing an embodiment applied to the battery pack with four battery cells.

Hereinafter, a battery pack 1 of the present invention will be explained in detail according to embodiments shown in the following drawings.

The battery pack 1 comprises a square pole-like battery case 2, four battery cells 3, 3 . . . , a separator 4 to separate the battery cells 3, 3 that are disposed upward and downward out of the battery cells 3, 3 . . . , a substrate 6 on which an IC chip 5 is mounted to compute and store the remaining amount of the battery pack 1 and a battery terminal 7 that is exposed from one end surface (front end surface) in the longitudinal direction of the battery case 2 attached onto the substrate 6 (refer to FIG. 2).

By the way, the U direction, the D direction, the L direction, the R direction, the F direction, the B direction that are indicated by arrow marks in respective drawings denote the upward direction, the downward direction, the left direction, the right direction, the front direction and the back direction, respectively. In addition, the above-mentioned directions indicated in this specification are for convenience' sake and are subject to being changed depending on the circumstances in which the battery pack 1 is used.

The four battery cells 3, 3 . . . are provided in a way that they are superposed one on top of another in the up and down direction, and the left and right direction, which will be described in detail later on. Two of a battery cell 3r (⌈r⌋ denotes the right side. Same as above.) and a battery cell 3l (⌈l⌋ denotes the left side. Same as above.) are combined with each other with a double-faced adhesive sheet material 8 serving as an insulating member. These cells are connected with each other in series, which will be described later on, and further, two of upper side left and right battery cells 3ur, 3ul (⌈u⌋ denotes the upper side. Same as above) and two of lower side left and right battery cells 3dr, 3dl (⌈d⌋ denotes the lower side. Same as above.) are connected in parallel by a circuit pattern (not shown) formed on the substrate 6.

The battery case 2 has an upper side case 10 and a lower side case 20, both of which are shaped like a box, and is constituted such that the upper side case 10 and the lower side case 20 are combined with each other with respective openings thereof made to join with each other (refer to FIG. 2).

The inside dimensions in the left and right direction of the upper side case 10 and the lower side case 20 are approximately equivalent to or slightly greater than the left and right width of two of the battery cells 3ur, 3ul that are disposed in the left and right direction, and the inside height of the upper side case 10 is formed greater than the height dimension of one battery cell 3 with the inside height of the lower side case 20 formed smaller than the height dimension of one battery cell 3. When the upper side and lower side cases are combined as the battery case 2, the height of the inside space is formed approximately equivalent to or slightly greater than the height of two of the battery cells 3u, 3d that are superposed one on top of another through the separator 4 (refer to FIG. 13).

In the central portion of the upper side case 10, there are formed a stepped difference part 11 slightly long in the front and back direction with the front face side thereof being formed concave and the inner face side formed convex, and a projecting part 12 approximately on the central portion of the inner face side of the stepped difference. The projecting part 12 is formed at positions corresponding to upper side adjacent side edge parts 3E, 3E of two of the battery cells 3ur, 3ul that are provided upper side left and right, which will be described later on, so as to press these upper side edge parts 3E, 3E from the upper direction (refer to FIG. 13).

At upper corner portions on the left and right inner face sides of the upper side case 10, there are formed small ribs (hereinafter, to be referred to as ⌈upper corner rib⌋) 13, 13, . . . (refer to FIG. 7), and the upper corner ribs 13, 13, . . . press, from the upper direction, the upper side side edge parts 3E, 3E of the upper side battery cells 3ur, 3ul housed in the battery case 2 (refer to FIG. 13).

Figure 13:
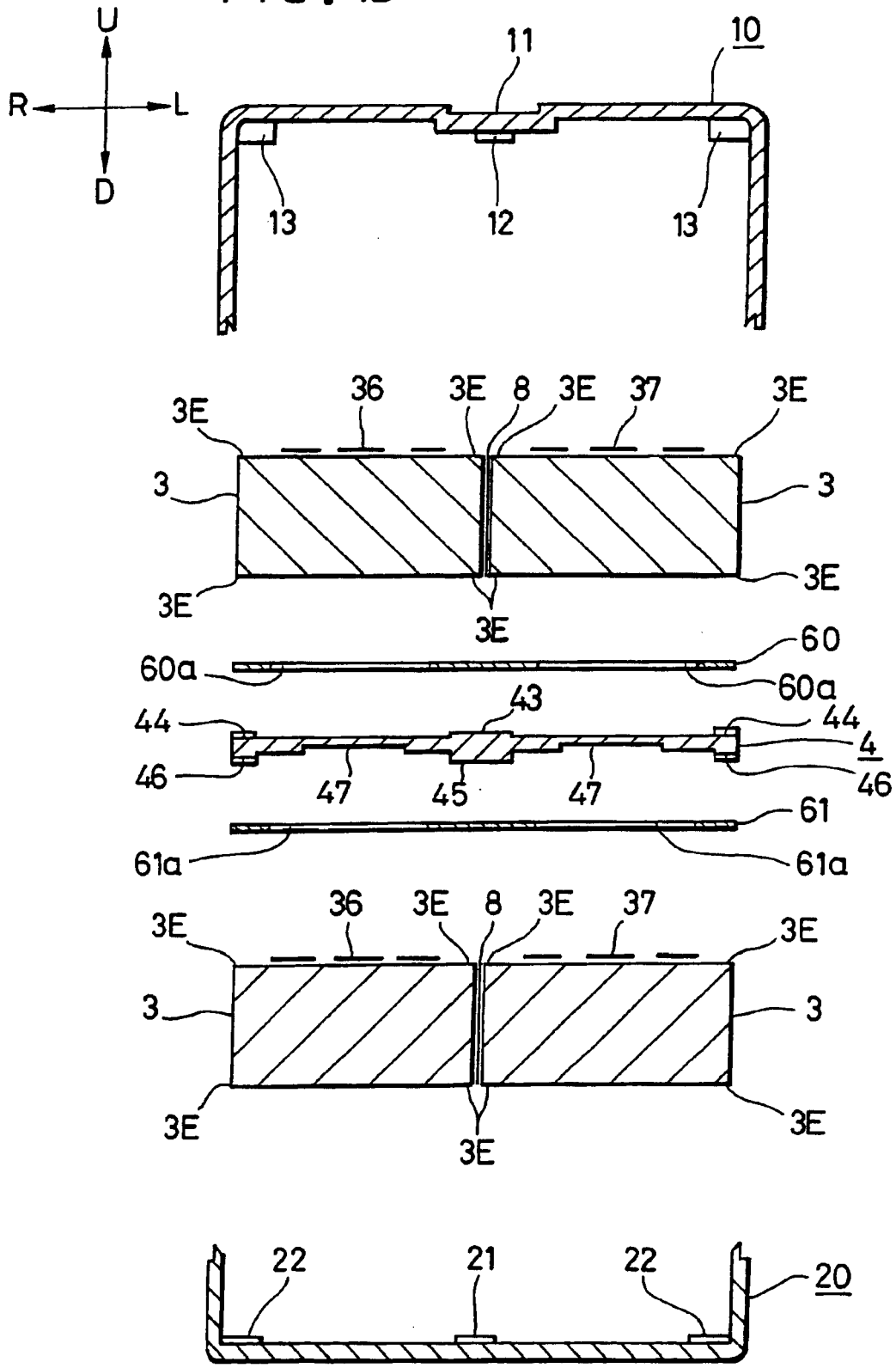
FIG. 13 is a perspective diagram, after cutting off the battery pack at the approximately central portion thereof, showing respective portions by exploding them up and down.

In the central portions of the left and right portions of the lower inner face of the lower side case 20, there are provided small ribs 21, 21 . . . extending in the left and right direction and at appropriate intervals in the front and back direction (refer to FIG. 8), and the small ribs 21, 21 . . . are provided at positions corresponding to lower side adjacent side edge parts 3E, 3E of two of the battery cells 3dr, 3dl disposed in the lower side left and right direction, which will be described later on, so as to press from the lower direction the lower side side edge parts 3E, 3E housed in the battery case 2 (refer to FIG. 13).

At lower corner portions on the left and right inner face sides of the lower side case 20, there are formed small ribs (hereinafter, to be referred to as ⌈lower corner rib⌋) 22, 22, . . . (refer to FIG. 8), and the lower corner ribs) 22, 22, . . . press from the lower direction the lower side side edge parts 3E, 3E of the lower side battery cells 3dr, 3dl when the battery cell 3 is housed in the battery case 2 (refer to FIG. 13).

By the way, the projecting part 12 and the upper corner ribs 13 of the upper side case 10 and the lower corner rib part 22 and the small ribs 21 of the lower side case 20 correspond to [side edge pressing part] in claims.

Figure 17:
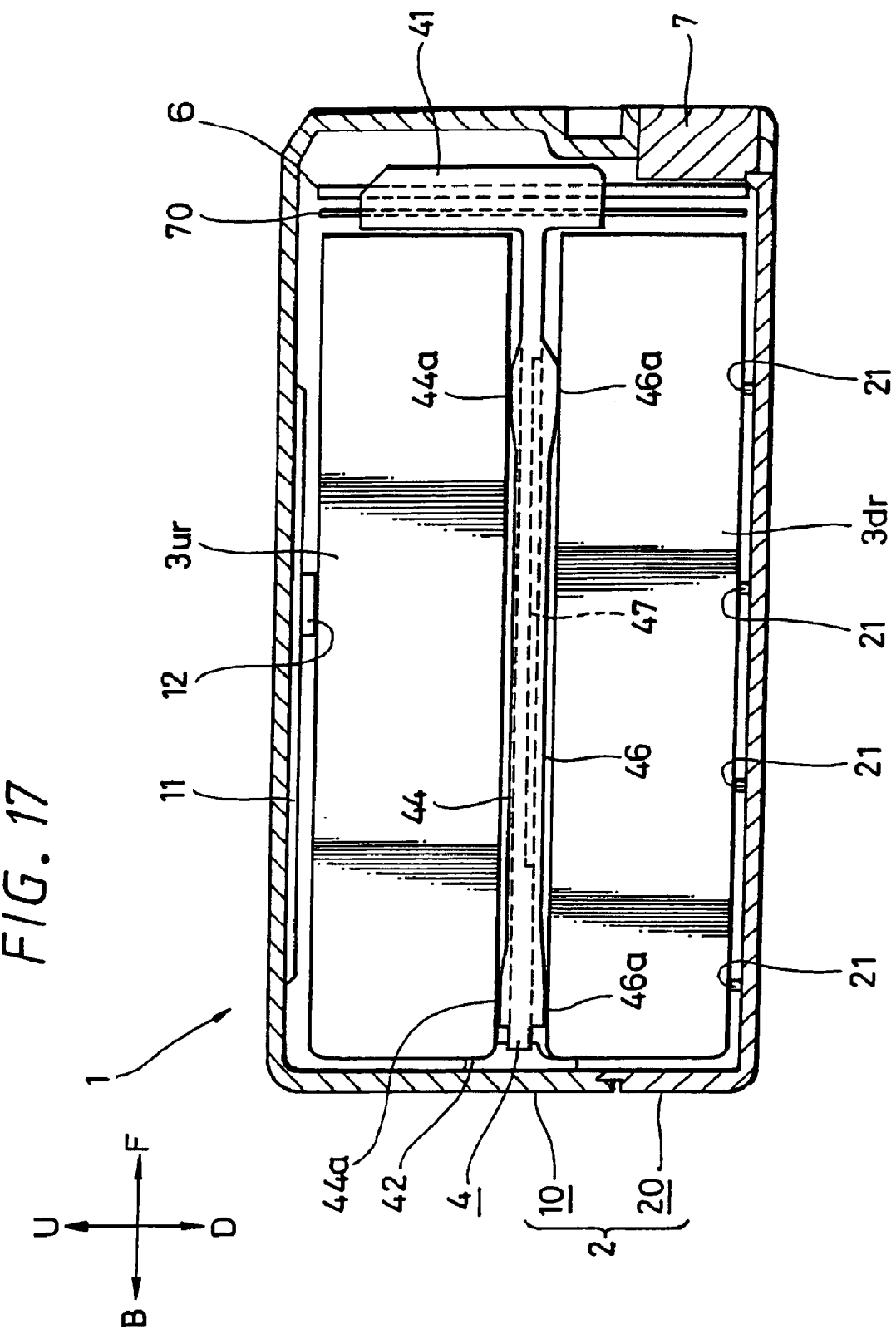
FIG. 17 is an enlarged longitudinal view of the battery pack being cut off at a position including a battery terminal in the longitudinal direction, showing the battery cells and separator that are not cut off.

A rectangular cutaway 23 is formed to open at a position that is the front face and is biased to the right side from the central portion in the left and right direction of the front face and at the front end portion of the undersurface continuous from the biased portion, and the above-mentioned battery terminal 7 is slid from the upper direction and attached to the rectangular cutaway 23, with the front face of the battery terminal attached to the rectangular cutaway 23 being made to be approximately flush with the lower side case 20 (refer to FIG. 17).

A stepped difference is formed at the peripheral edge of an opening of the lower face of the upper side case 10 to face in the inner and lower directions, and a peripheral wall (hereinafter, referred to as [outer peripheral wall]) 14 made thin of the upper side case is formed with a taper part 14a being formed at the inside edge of the lower end edge of the outer peripheral wall (refer to FIG. 19).

The upper surface of the stepped difference is formed into an inclined plane biased in the lower direction as the upper surface goes inside, and an inside portion having the inclined plane is formed into a circular projecting bar (hereinafter, referred to as [inside projecting bar])15, with the result that circular v groove 16 opening in the lower direction is formed between the inside projecting bar 15 and the above-mentioned outer peripheral wall 14 (refer to FIG. 19).

Figure 19:
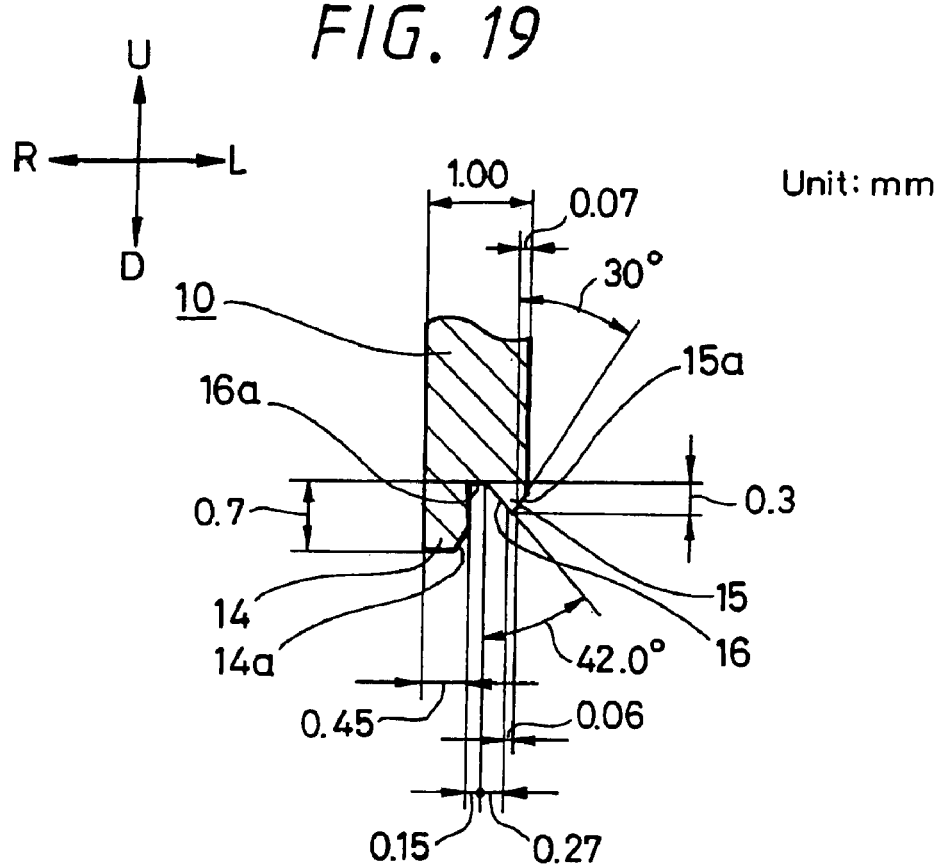
FIG. 19 is a cross-sectional diagram by enlarging an opening peripheral edge of the upper side case.

In addition, the bottom (upper surface) 16a of the v groove 16 is formed into a horizontal plane that is narrow in width with a taper part 15a being formed at the inside edge of the above-mentioned inside projecting bar 15 (refer to FIG. 19).

A stepped difference facing in the outer and upper directions is formed at the upper peripheral edge of an opening of the lower side case 20, and a peripheral wall (hereinafter, referred to as [inner peripheral wall]) 24 made thin of the inside of the lower side case 20 is formed, with the upper end of the inner peripheral wall 24 formed into a small inclined plane (hereinafter, referred to as [outside inclined plane]) 25 on the outside thereof and a comparatively large inclined plane (hereinafter, referred to as [inside inclined plane]) 26 on the inside thereof. The angle of the inside inclined plane relative to the vertical direction is formed slightly smaller than that of the inclined plane of the inside projecting bar 15 that forms the v groove 16 of the above-mentioned upper side case 10 (refer to FIG. 20). Meanwhile, the concrete shapes of respective portions (numerical values) will be described later on.

Figure 6:
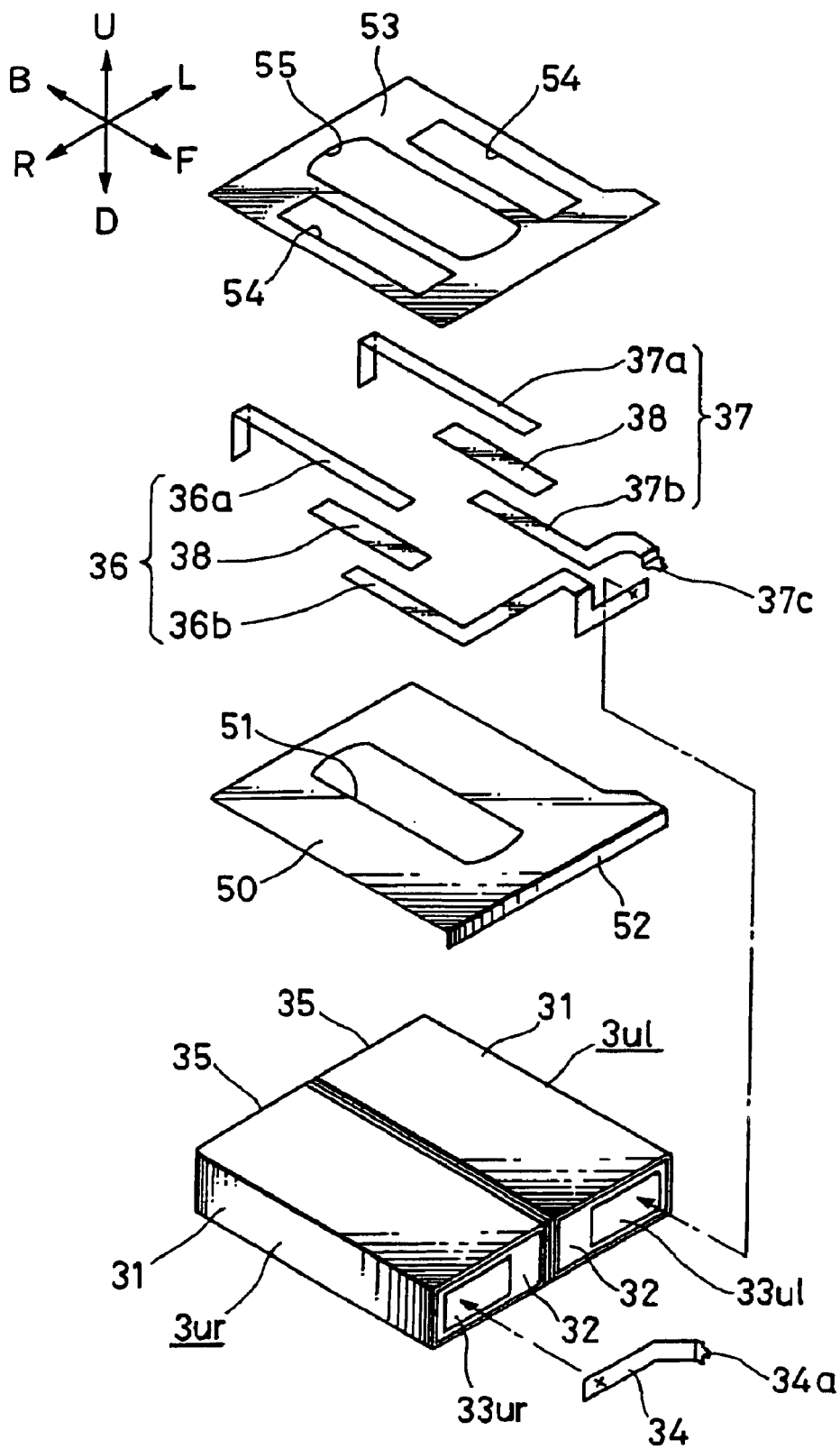
FIG. 6 is a perspective view of exploded two left and right battery cells and respective tabs.

The battery cell 3 is shaped like a flat rectangular solid and comprises a battery can 31 with one end thereof opening in the longitudinal direction, a battery lid 32 to cover the opening of the battery cell 31, a battery device and the like, not shown in the figures, to be housed in the battery can 31, and a positive pole terminal parts 33 is provided in the battery lid 32 (refer to FIG. 6).

In addition, the positive pole terminals 33, 33 . . . provided in the battery lids 32, 32, . . . of the respective battery cells 3, 3, . . . are provided at positions biased in one direction from the central portion of the left and right direction, and two of the battery cells 3r, 3l disposed left and right are combined with each other in a way that the positive pole terminals 33r, 33l are oriented in a positional relationship to distance themselves from each other (refer to FIG. 6).

Further, since the two left and right battery cells 3ur, 3ul and 3dr, 3dl connected in series of two up-and-down pairs of the battery cells are such that the up and down battery cells are constituted the same, an explanation will be given to one (up side) two left and right battery cells 3ur, 3ul, and a detailed explanation of the other (lower side) two left and right battery cells 3dr, 3dl will be omitted.

In examining the two left and right battery cells 3ur, 3ul from an electrical view point, the right side battery cell 3ur of the battery cells arranged in series is connected to the positive pole side, and the left side battery cell 3ul is connected to the negative pole side, respectively (refer to FIG. 6).

A positive pole side tab 34 with its tip extending rightward and being folded back forward is attached to a positive pole terminal part 33ur by spot welding (refer to FIGS. 4 and 6), with the tip portion that was folded back forward serves as a lead part 34a to be soldered to the above-mentioned substrate 6 (refer to FIG. 2).

An insulating sheet (cell side insulating sheet) 50 that is approximately equivalent in size to the whole surface excluding left and right both side edges of the battery cells 3ur, 3ul is attached onto the upper surface of the two battery cells 3ur, 3ul that are disposed left and right, and a long aperture opening (hereinafter, referred to as long-aperture opening) 51, from which a combined portion of the two left and right battery cells is exposed is formed approximately in the central portion of the cell side insulating sheet 50. In addition, a folded part 52 folded downward for covering part of the battery lid 32 is formed at the front edge of the insulating sheet 52 (refer to FIG. 6). By the way, the portion between the left and right both side edges of the cell side insulating sheet 50 and the left and right both side edges of the battery cells 3ur, 3ul corresponds to [flank portion of the insulating sheet] in claim 3, and the above-mentioned long aperture opening 51 also corresponds to [flank portion of the insulating sheet] in claim 3.

Figure 3:
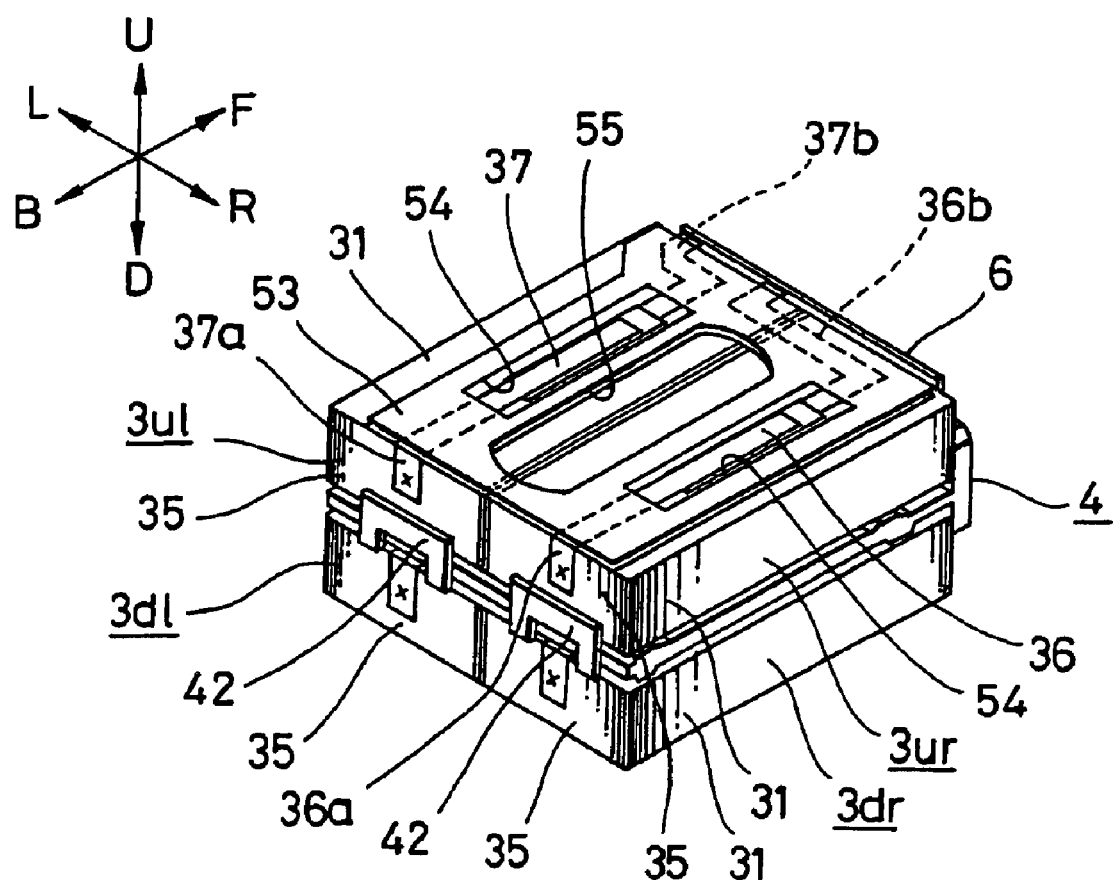
FIG. 3 is a perspective view seen from the backward direction of a state in which the battery case is removed.

Then, in the right side battery cell 3ur, there is provided an intermediate collection tab 36 that extends from a can bottom 35ur of the battery cell 3ur to the side of a battery lid 32ur and creeps over the upper side face of a battery can 31ur through the above-mentioned cell side insulating sheet 50, the intermediate connection tab 36 being divided into two consisting of a can bottom side tab 36a and a battery lid side tab 36b in the front and back direction (refer to FIG. 6), with the end portion of the battery bottom side tab 36a being spot-welded to the can bottom 35ur of the right side battery cell 3ur (refer to FIG. 3). Further, the end portion of the battery lid side of the above-mentioned battery lid side tab 36b, after extending in the left direction, is folded downward to creep over a battery lid 32ul, extending to a positive pole terminal part 33ul of a left side battery cell 3ul and is spot-welded to the positive pole terminal part 33ul (refer to FIG. 4).

In addition, in the left side battery cell 3ul, there is provided a negative side tab 37 that extends from a can bottom 35ul to the side of a battery lid 32ul and creeps over the upper side face of a battery can 31ul through the above-mentioned insulating sheet 50, the negative pole side tab 37, as is the above-mentioned intermediate connection tab 36, being divided in two consisting of a can bottom side tab 37a and a can lid side tab 36b in the front and back direction (refer to FIG. 6), with the end portion of the above-mentioned can bottom side 37a spot-welded to the can bottom 35*ul* of the left side battery cell 3*ul* (refer to FIG. 3). Further, the end portion of the battery lid side of the above-mentioned battery lid side tab 36*b* has the front end thereof folded downward and then folded forward on the front face side of the battery lid 32 of the left side battery cell 3*ul*, with the tip portion folded forward serving as a lead part 37*c* by being soldered to the above-mentioned substrate 6 (refer to FIGS. 2 and 4).

As a result, since the above-mentioned cell side insulating sheet 50 is interposed between the intermediate connection tab 36, the negative side tab 37 and the battery cans 31*ur*, 31*ul*, insulation is established between the battery cans 31*ur*, 31*ul* and the intermediate connection tab 36, the negative pole side tab 37, particularly between a battery lid side tab 36*b* and 37*b* of the respective tabs 36 and 37 (refer to FIG. 6).

PTC 38, 38 are interposed between the can bottom side tabs 36*a*, 37*a* respectively divided into two in the front and back direction of the above-mentioned intermediate connection tab 36 and the negative pole side tab 37 and the battery lid side tab 36*b*, 37*b*, so that supply of power is shut off when the battery cells 3*ur*, 3*ul* become heated high (refer to FIG. 6).

Another insulating sheet (upper side insulating sheet) 53, approximately the same size of the above-mentioned cell side insulating sheet 50, is further attached onto the upper surface of the two left and right battery cells 3*ur*, 3*ul* over which these intermediate connection tab 36 and the negative side tab 37 creep (refer to FIG. 6).

Specifically, the upper side insulating sheet 53 has rectangular openings (hereinafter, referred to as [rectangular opening]) 54, 54 formed at the positions corresponding to the region where the bottom side tabs 36*a*, 37*a* and the battery lid side tabs 36*b*, 37*b*, of the above-mentioned intermediate tab 36 and the negative side tab 37 are connected with each other through the PTC 38, 38. Further, at the position corresponding to the long-aperture opening 51, there is formed a long-aperture opening 55 that is the same size of the long-aperture opening 51 (refer to FIG. 6). By the way, the portions between the left and right both side edges of the upper side insulating sheet 53 and the left and right both side edges of the battery cells 3*ur*, 3*ul* correspond to [flank portion of the insulating sheet] in claims, and the above-mentioned long-aperture opening 55 corresponds to [flank portion of the insulating sheet] in the scope of claims, and further, the above-mentioned rectangular openings 54, 54 corresponds to [flank aperture in the insulating sheet] in claim 5.

Then, adhesive material is applied onto the surface of such upper side insulating sheet 53, which is attached onto the cell side insulating sheet 50 on the above-mentioned battery cells 3*ur*, 3*ul* so as to sandwich the above-mentioned intermediate connection tab 36 and the negative side tab 37.

Figure 4:
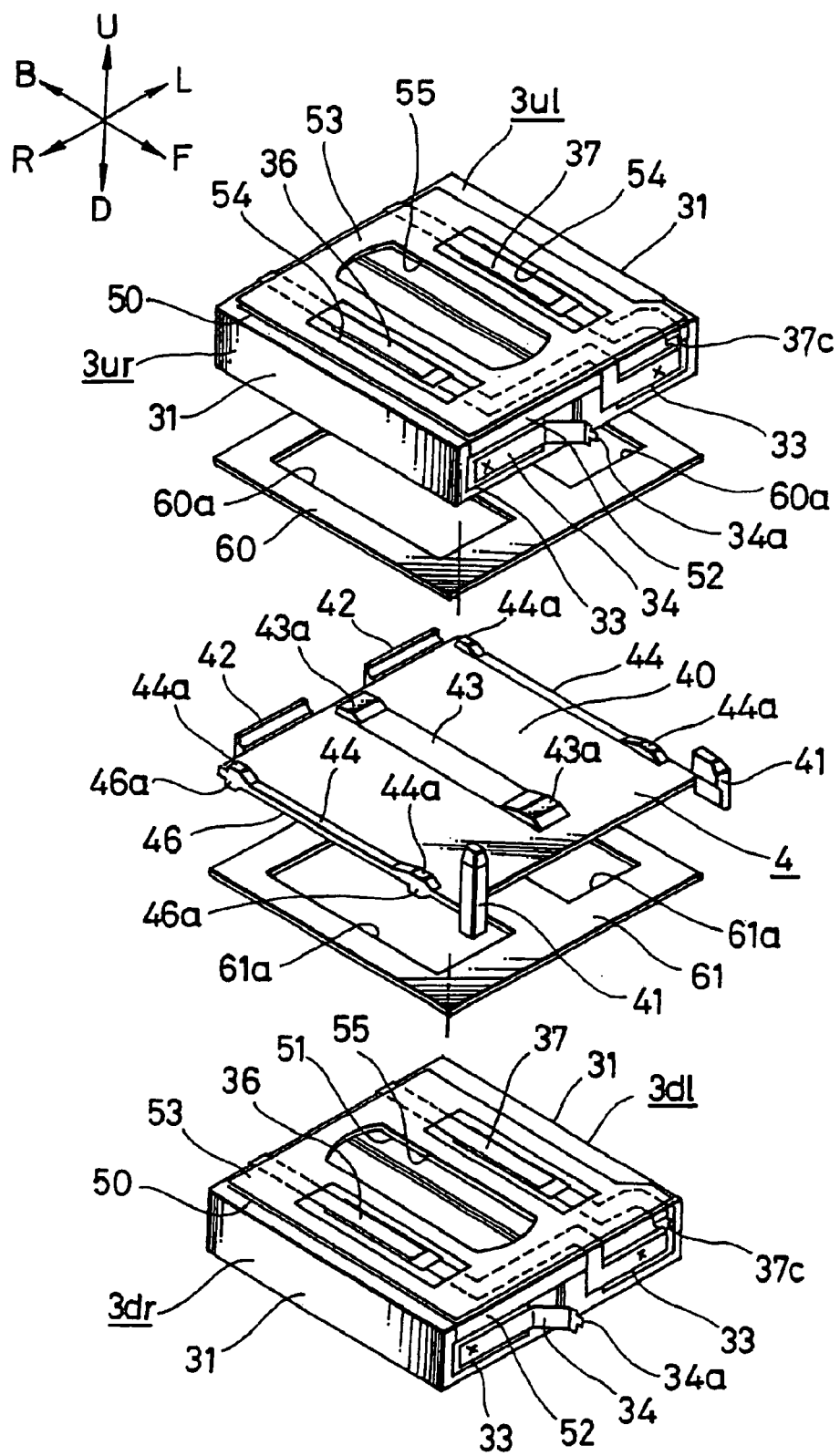
FIG. 4 is a perspective view shown by exploding two upper and lower pairs of the four battery cells and a separator in the upper and lower direction.

As a result, the intermediate connection tab 36 and the negative pole side tab 37 are almost fixed on the side of the upper surface of the two battery cells 3*ur*, 3*ul* by being disposed in a way that they do not move easily, and the portions at which the can bottom side tabs 36*a*, 37*a* and the battery lid side tabs 36*b*, 37*b* and the PTC 38, 38 are connected, that is, the portions where thickness in the up and down direction becomes thicker are exposed in the upper direction from the rectangular openings 54, 54 of the upper side insulating sheet 53 (refer to FIG. 4).

In the separator 4, a flat plate part 40 whose plane face is almost the same as that of the two battery cells 3*r*, 3*l* disposed left and right, two substrate regulating pieces 41, 41 provided to project at the left and right corner portions of the front end edge of the flat plate part 40 to extend in the up and down direction thereof and battery cells regulating pieces 42, 42 projected in the up and down direction at the back end edge of the above-mentioned flat plate part 40 so as to correspond to the can bottoms 35, 35, . . . of the respective battery cells 3, 3, . . . are integrally formed (refer to FIG. 9).

Figure 18:
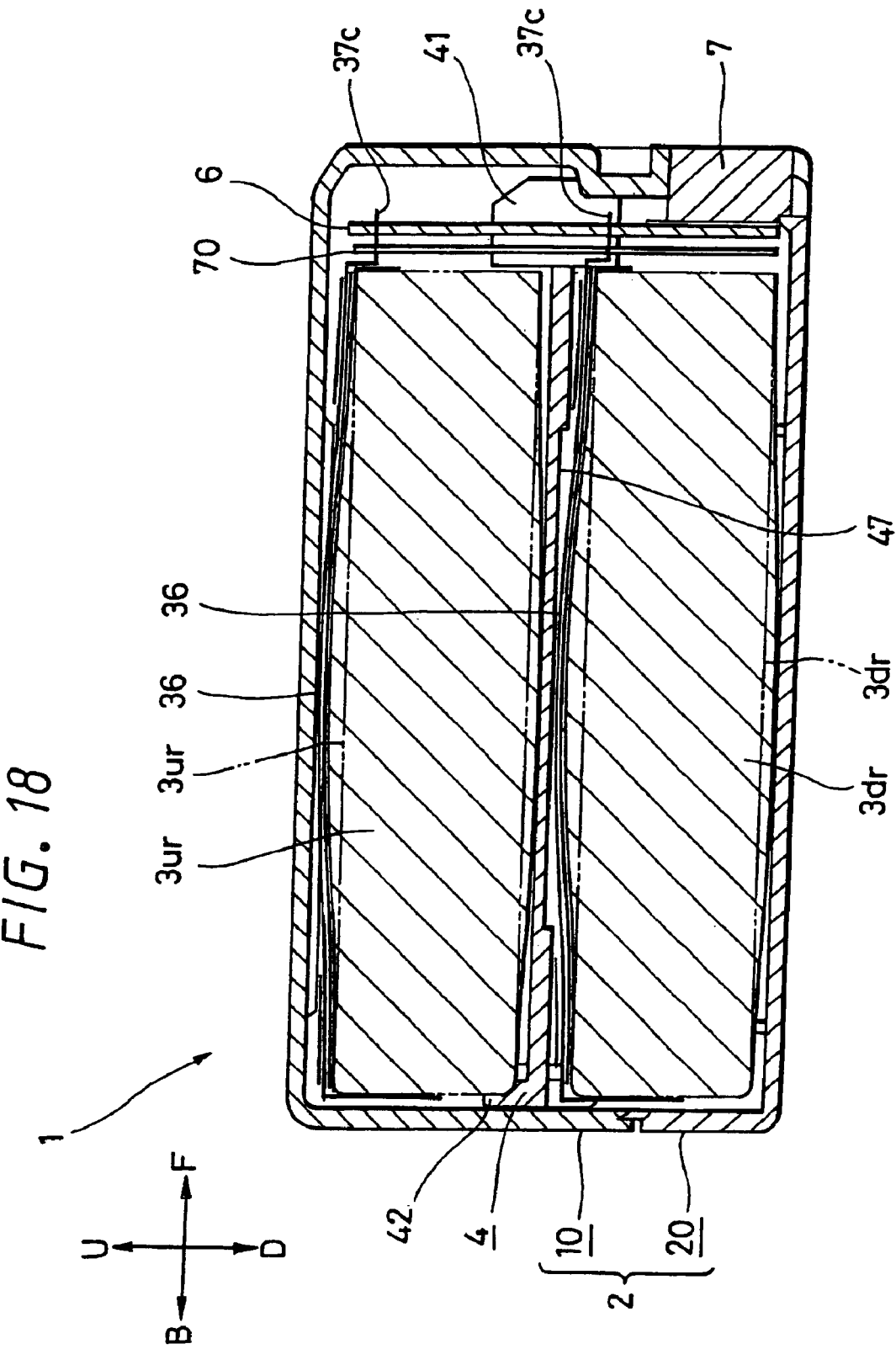
FIG. 18 is an enlarged longitudinal cross-section view of the battery pack being cut off at a position including the battery pack in the longitudinal direction.

The substrate regulating pieces 41, 41 are ones for securing a space in the front side within the battery case 2 so as to house the above-mentioned substrate 6 when the separator 4 is housed in the battery case (refer to FIGS. 17 and 18).

The two battery regulating pieces 42, 42 formed at the back end edge of the flat plate part 40 are ones for determining the positions in the front and back direction of the two left and right battery cells 3*ur* (*dr*), 3*ul* (*dl*)(of upper side and lower side) with the can bottoms 35, 35 . . . of the two battery cells coming in contact therewith (refer to FIGS. 17 and 18). Further, the portions projecting downward of the battery cell regulating pieces 42, 42 have rectangular cutaways formed in the central portions thereof, with the result that the can bottom side tabs 36*a*, 37*a* of the lower side two battery cells 3*dr*, 3*dl* do not interfere with the battery cell regulating pieces 42, 42 (refer to FIG. 3).

On the upper surface of the flat plate part 40 of the separator 4, there are an upper surface central flat projecting bar 43 in the central portion thereof, extending in the front and back direction, upper surface left and right flat projecting bars 44, 44 at the left and right both side edges of the projecting bar 43, extending in the front and back direction, all of them being integrally formed with separator 4, and flat projecting parts 43*a*, 43*a*, 44*a*, 44*a*, . . . further slightly projecting upward are formed at the front end and back end portions of the respective flat convex parts 43*a*, 43*a*, 44*a*, 44*a* (refer to FIG. 9).

Meanwhile, the positions where the respective flat convex parts 43*a*, 43*a*, 44*a*, 44*a*, . . . are formed are made to correspond to the reference position in thickness dimension of the battery cell 3.

Namely, since the battery can 31 of the battery cell 3 is usually formed by draw processing, it is difficult to accurately process the thickness in the up and down direction of every position. Therefore, as for the thickness (dimension in the up and down direction) of the battery can 31, of the peripheral edge thereof seen flatways, it is a common practice to choose several positions serving as reference dimensions and to mold the battery can 31 by increasing the accuracy of dimensions at the reference positions.

As a result, these reference positions are accurately formed regions with respect to the thickness of the battery cell 3, and pressing the regions by the inner face of the battery case 2 does not invite an emergence of dimensional errors of the both. Consequently, the battery cell 3 can be pressed without play when it is housed in the battery case 2.

Figure 10:
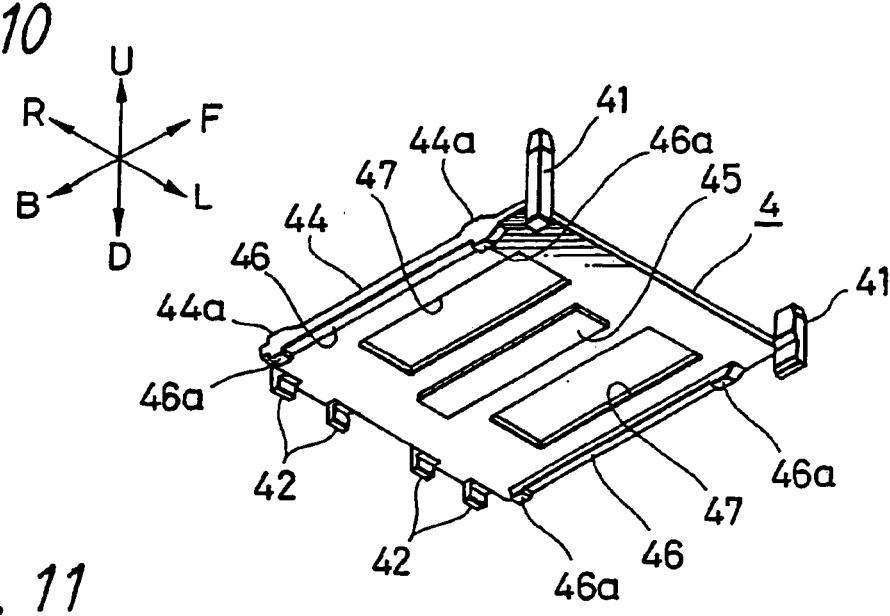
FIG. 10 is a perspective view of the separator seen obliquely from the lower front direction.
Figure 11:
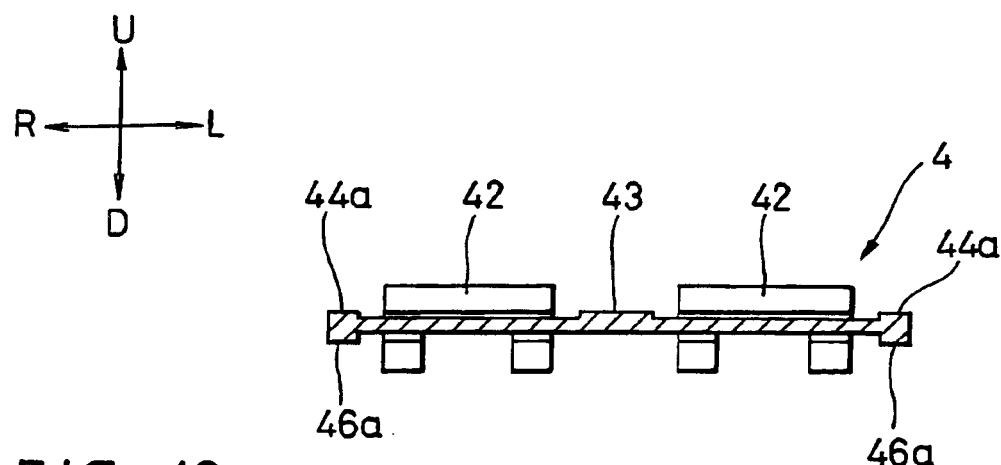
FIG. 11 is a cross-sectional diagram along an XI—XI line of FIG. 9.
Figure 12:
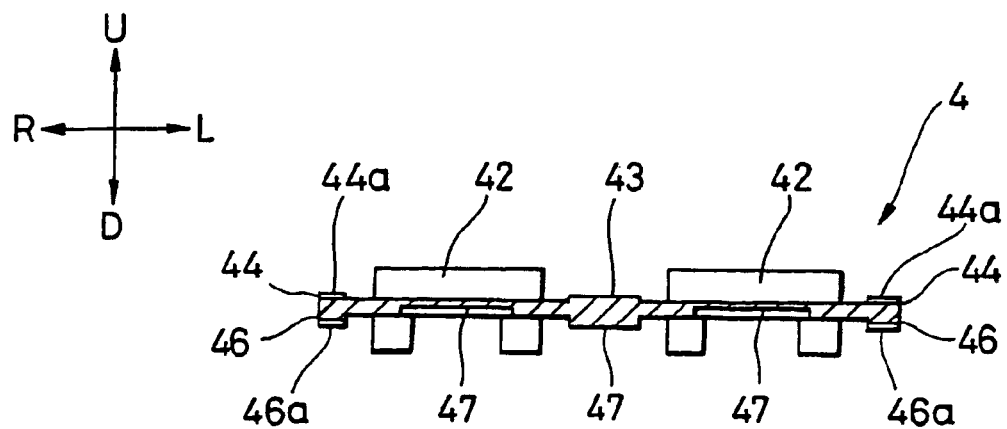
FIG. 12 is a cross-sectional diagram along an XII—XII line of FIG. 9.

On the under surface of the flat plate part 40 of the separator 4, there are an under surface central flat projecting bar 45 in the central portion thereof, extending in the front and back direction, an under surface left and right flat projecting bars 46, 46 at the left and right both side edges of the flat projecting bar 45, extending in the front and back direction, all of them being integrally formed with the separator 4, and further, flat convex parts 46*a*, 46*a*, . . . slightly projecting downward are formed at the front end and back end portions of the under surface left and right flat projecting bars 46, 46 (refer to FIG. 10). Meanwhile, such flat convex parts 46*a*, 46*a*, . . . are formed also at the positions corresponding to the reference positions in thickness dimensions of the battery cell 3.

In addition, on the under surface of the flat plate part 40, there are formed flat concave parts (hereinafter, referred to as [under surface flat concave parts]) 47, 47 long in the front and back direction (refer to FIG. 10) between the above-mentioned under surface central flat projecting bar 45 and each of the both left and right flat projecting bars 46, 46, and the under surface flat concave parts 47, 47 correspond to the portions where the can bottom side tabs 38, 38 and the battery lid side tabs 36a, 37a and the PTC 38, 38 are connected with each other, that is, the ones where thickness in the up and down direction become thicker (refer to FIG. 13).

The two battery cells 3r, 3l disposed left and right as mentioned above are attached onto the upper surface side and the lower face side of the separator 4 that is formed in this manner.

Specifically, a double-faced adhesive sheet 60 with two rectangular apertures 60a, 60a formed therein, that is one size smaller than the plane form of the battery cell 3, is attached onto the upper surface of the separator 4, and the two battery cells 3ul, 3ur are placed thereon to eventually be attached onto the separator 4 (refer to FIG. 4).

At this time the respective battery cells 3ur, 3ul are placed on the respective flat convex parts 43a, 43a, 44a, 44a, . . . at the both sides in the front and back direction of the above-mentioned upper surface central flat projecting bar 43 and the upper surface left and right flat projecting bars 44, 44, that is, the back end side edge parts 3E, 3E and the front biased left and both side edge parts 3E, 3E come in contact with the separator 4 through the above-mentioned double-faced adhesive sheet 60. Therefore, the under surfaces of the battery cells 3ur, 3ul are in the state of having gaps with the separator 4 (refer to FIGS. 14 and 15). By the way, the above-mentioned double-faced adhesive sheet 60 is graphically not shown in FIGS. 14 through 18.

A double-faced adhesive sheet 61 that is similar to the double-faced adhesive sheet 60 attached onto the above-mentioned upper surface thereof is attached onto the under surface of the separator 4, and the two battery cells 3dr, 3dl are positioned thereunder to eventually be attached to the separator 4 (refer to FIG. 4).

At this time the respective flat convex parts 46a, 46a, . . . at both sides in the front and back direction of the above-mentioned under surface central flat projecting bar 45 and the under surface left and right flat projecting bars 46, 46 come in contact with the battery cells 3dr, 3dl, that is, the back end side edge parts 3E, 3E and the front biased left and right both side end edge parts 3E, 3E come in contact with the separator 4. In addition, the portions where the can bottom side tabs 38a, 37a and the battery lid side tabs 36b, 37b and PTC 38, 38 are connected with each other, that is, the ones where the thickness in the up and down direction thereof becomes thicker are positioned within the above-mentioned under surface flat concave parts 47, 47 without coming in contact with the separator 4, and are in the state of having predetermined gaps (refer to FIGS. 14 and 15). By the way, the above-mentioned double-faced adhesive sheet 61 is not graphically shown in FIGS. 14 through 18.

An IC chip 5 is mounted on the left side of the substrate 6 that is provided in front of the four battery cells 3, 3, . . . disposed in the front and back, and the left and right, directions, and the battery terminal 7 is mounted on the lower portion at the right side thereof with an insulating sheet (hereinafter, referred to as [substrate side insulating sheet]) 70 interposed between the substrate 6 and the four battery cells 3, 3, . . . (refer to FIG. 5).

In the substrate 6, land apertures 6a, 6a, . . . are formed at positions corresponding to lead portions 34a, 34a, 37c, 37c of the positive pole side tabs 34, 34 and the negative pole side tabs 37, 37 in the above-mentioned respective battery cells 3, 3, . . . . Further, cut lines 71, 71, . . . are formed at positions corresponding to the land apertures 6a, 6a, . . . of the substrate 6 in the substrate side insulating sheet 70 (refer to FIG. 5).

Then the substrate 6 is assembled to the respective battery cells in such a way that first of all, the lead parts 34a, 34a, 37c, 37c of the respective positive side tabs 34, 34 and the negative pole side tabs 37, 37 are passed through the respective cut lines 71, 71 of the substrate side insulating sheet 70. And after being passed through the respective land apertures 6a, 6a, . . . of the substrate 6, the respective lead parts 34a, 34a, 37c, 37c projecting from the land apertures 6a, 6a, . . . of the substrate 6 are soldered onto the substrate 6 (refer to FIG. 2).

Consequently, the left and right two battery cells 3r, 3l of the four battery cells 3, 3, . . . are connected in series, and the upper side and lower side two pairs of the battery cells 3, 3, . . . are connected in parallel (refer to FIG. 2).

Figure 5:
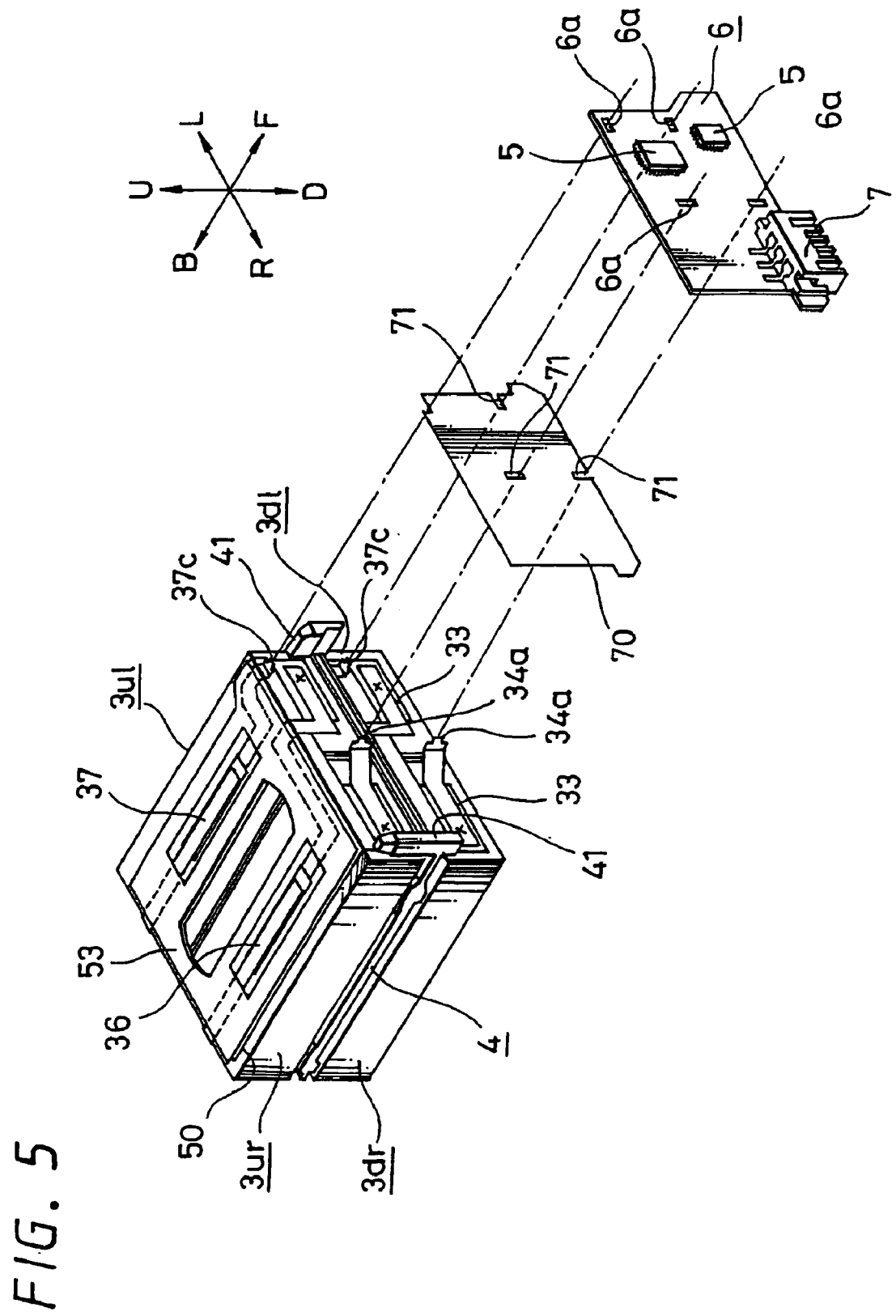
FIG. 5 is a perspective view of the four battery cells and a substrate exploded in the front and back direction.

By the way, a cutaway, not a cut line, is formed at a position in the substrate side insulating sheet 70 as corresponds to the lead part 37c of the negative pole side tab 37 of the left upper side battery cell 3ul (refer to FIG. 5). This is because the upper side edge portion of the substrate side insulating sheet 70 is positioned at the reverse side of the folded part 52 of the upper side insulating sheet 53 and the lead part 37c of the negative pole side tab 37 of the left upper side battery cell 3ul is positioned to creep over the front face of the folded part 52.

Therefore, the four battery cells 3, 3, . . . to which the substrate 6 is attached in this manner are housed in the battery case 2, and the battery pack 1 is assembled in the following manner.

First the four battery cells 3, 3, . . . that are combined with each other in the up and down, and left and right, directions are housed in the lower side battery case 20 from the upper direction.

At this time the battery terminal 7 is slide-inserted in the rectangular cutaway 23 of the lower side case 20 from the upper direction (refer to FIG. 2). As the result the battery terminal 7 is positioned in the front and back, and the left and right, directions with respect to the lower side case 20.

In addition, the lower side two battery cells 3dr, 3dl of the housed four battery cells 3, 3, . . . are placed on the small ribs 21, 21 and the lower corner ribs 22, 22, . . . of the lower side case 20, that is, only the left and right both side edge parts 3E, 3E of the battery cells 3dr, 3dl come in contact with the lower side case 20, leading to a state in which gaps emerge between the large portion of the under surface of the battery cells 3dr, 3dl and the bottom of the lower case 20.

Figure 16:
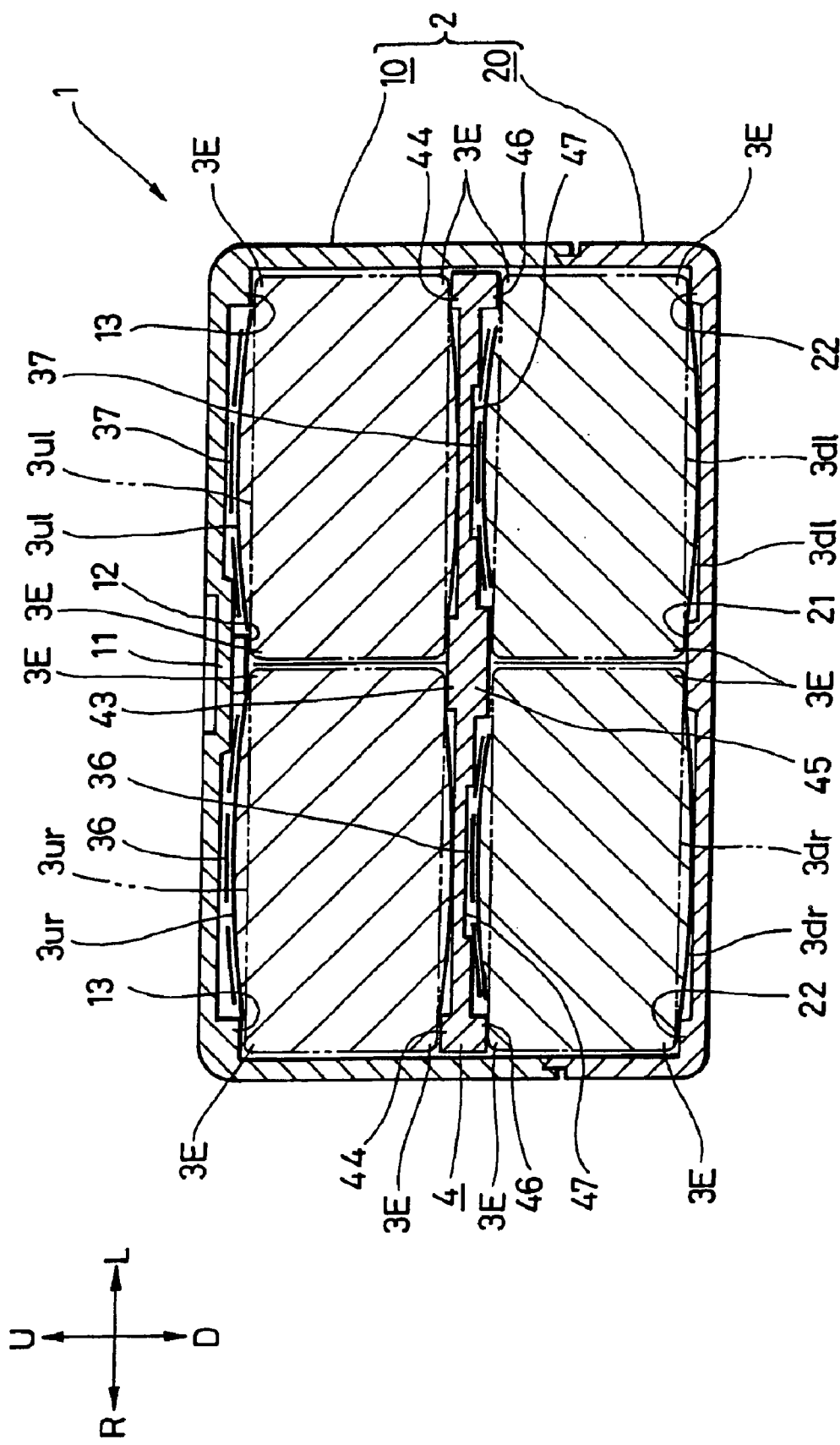
FIG. 16 is an enlarged cross-sectional view of the battery pack.

Next the upper side case 10 and the lower side case 20 are joined with each other so as to cover the battery cells 3, 3, . . . to combine the both (refer to FIGS. 13 and 16).

Figure 21:
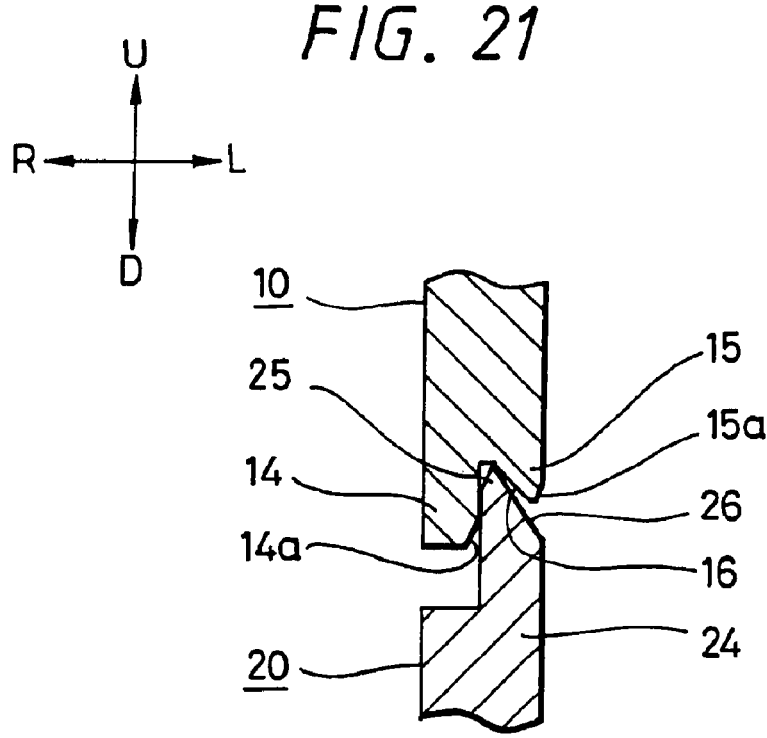
FIG. 21 is a cross-sectional diagram showing an enlarged state of the opening peripheral edge of the upper side case and the opening peripheral edge of the lower side case being joined with each other.

First of all, the upper end edge of the inner peripheral edge 24 formed at the opening edge of the lower side case 20 is engaged with the inside of the v groove 16 formed at the outer peripheral edge of the upper side case 10 (refer to FIG. 21).

At this time, since the taper part 14a is formed inside the outer peripheral wall of the upper case 10, and the outside inclined plane 25 is formed outside the inner peripheral wall 14 of the lower side case 20, although the upper side case 10 and the lower side case 20 are shifted in the front and back, and the left and right, directions in their positional relationship, engagement of the v groove 16 with the upper end edge of the inner peripheral wall 24 can be performed without fail (refer to FIG. 21).

In this state the inner side face of the outer peripheral wall 14 of the upper case 10 and the outside face of the inner peripheral wall 24 come in contact with each other face to face in the way that the face of the upper side case 10 and that of the lower side case 20 are approximately flush with each other (refer to FIG. 21).

In addition, when the upper side case 10 is joined with the lower side case 20, since the opening edge at the right front side of the upper side case 10 is pressed from the upper direction, positioning in the up and down direction of the batter terminal 7 is performed in the way that the battery terminal 7 is held between the lower side case 20 and the upper side case 10 to be fixed to the inside of the batter case 2.

Figure 23:
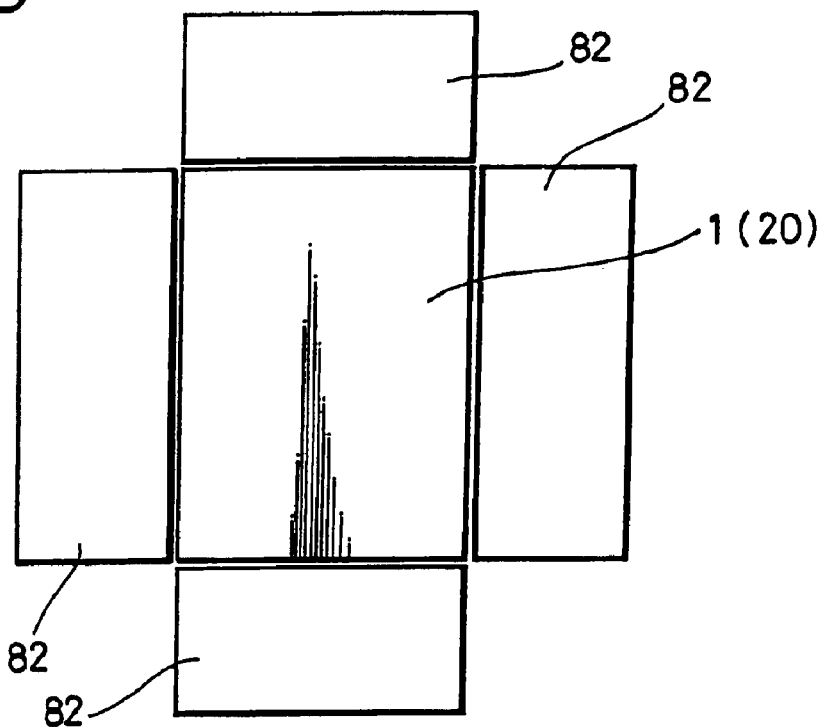
FIG. 23 is a plan view schematically showing a state of the battery pack being placed on a receiving platform of an ultrasonic welding device.
Figure 24:
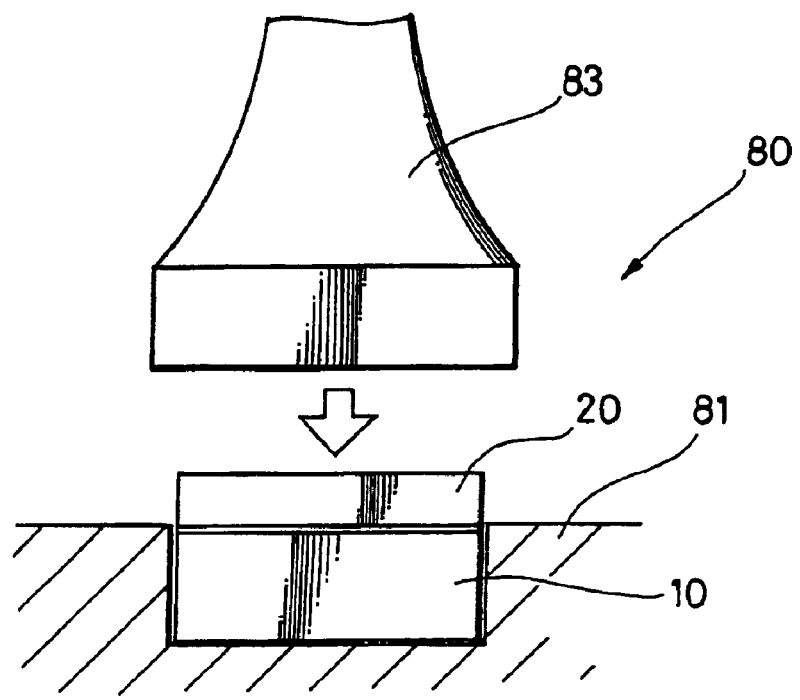
FIG. 24 is a side view partially showing a cross-sectional state of the battery pack being placed on the receiving platform of the ultrasonic welding device.

Next, ultrasonic welding is applied to the upper side case 10 and the lower side case 20, and the both are combined with each other (refer to FIGS. 23 and 24).

Specifically, the upper side case 10 and the lower side case 20 in the state of being combined with each other are turned upside down and placed on a receiving platform 81 of an ultrasonic welding device 80 (refer to FIGS. 23 and 24).

Figure 20:
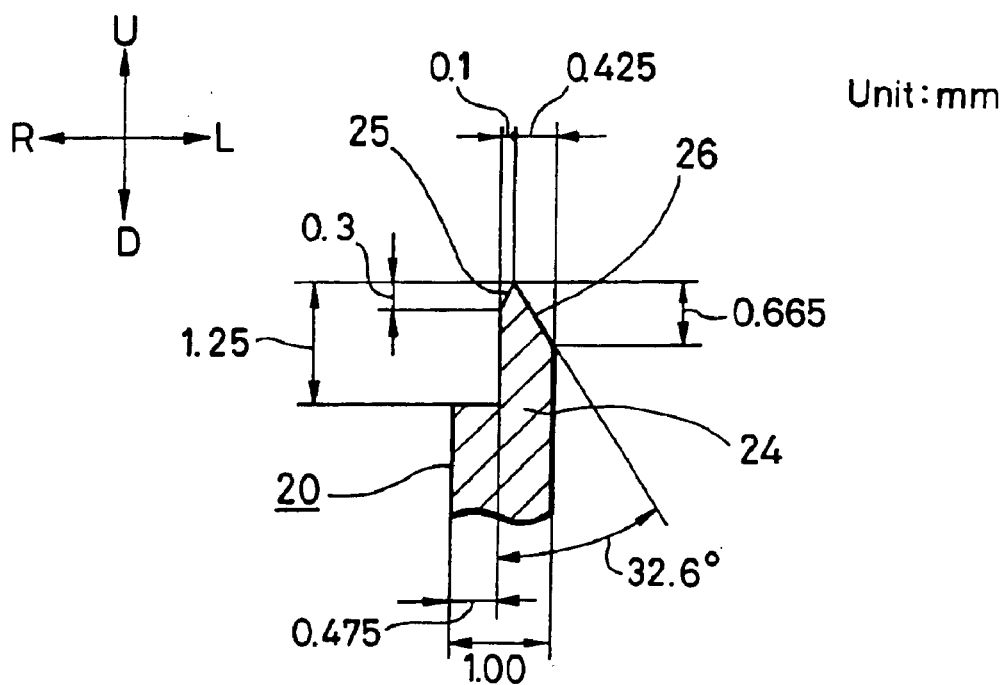
FIG. 20 is a cross-sectional diagram by enlarging an opening peripheral edge of the lower side case.

In addition, specific forms (numerical values) of respective portions of each of the opening peripheral edges of the upper side case 10 and the lower side case 20 will be shown in FIGS. 19 and 20. These numerical values are one example from first to last, and the present invention is not limited thereto.

The thickness of the upper side case is formed 1.0 mm, and that of the outer peripheral wall 0.45 mm. The height from the v groove bottom 16a of the outer peripheral wall 14 is formed 0.7 mm, and the width of the v groove bottom (horizontal plane) 16a is formed 0.15 mm. The angle of the inclined plane forming the v groove 16 of the inside projecting bar 15 is formed 42.0° relative to the vertical line, and the height from the v groove bottom 16a of the inside projecting bar 15 is formed 0.3 mm (refer to FIG. 19).

Further, the thickness of the lower side case 20 is formed 1.0 mm, and that of the inner peripheral wall 24 of the lower side case 20 0.525 mm. The height of the inner peripheral wall is formed 1.2 mm, and that of the region where the outside inclined plane 25 is formed is 0.3 mm while that of the region where the inside inclined plane is formed is 0.665 mm, and the angle of the inside inclined plane 26 relative to the vertical line 32.6° (refer to FIG. 20).

The above-mentioned receiving platform 81 has receiving jigs 82, 82 to approximately surround the upper side case 10 from the front and back, and the left and right, four directions, with gaps of inasmuch as 0.1 mm formed in-between (refer to FIGS. 23 and 24).

Next, a welding hone 83 of the ultrasonic welding device 80 is made to come in contact with the upper surface of the lower side case 20 that is turned upside down with appropriate contact pressure, and vibrations in predetermined frequencies are added thereto (refer to FIG. 24).

Figure 22:
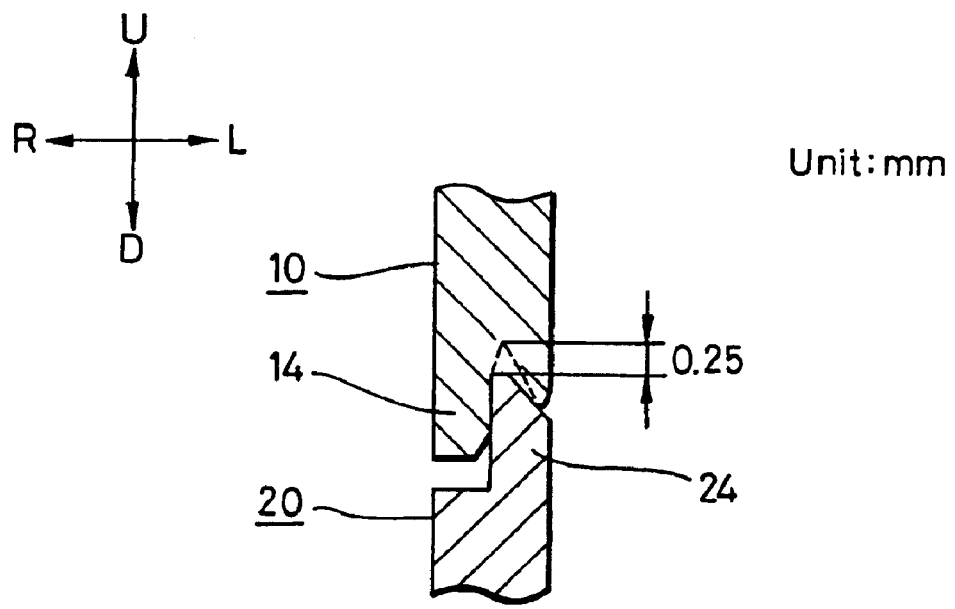
FIG. 22 is a cross-sectional diagram showing a state in which ultrasonic welding is applied to the state of FIG. 1.

As the result, the contact portions of the upper side case 10 and the lower side case 20, that is, the bottom 16a of the v groove 16 of the upper side case 10 and the tip portion of the inner peripheral wall 24 of the lower side case 20 are welded (refer to FIG. 22).

In the case of the upper side case 10 and the lower side case 20 in the above-mentioned dimensions, such welding is to be terminated when the amount of welding becomes 0.25 mm, that is, at the position in which the height in the welding direction is reduced by 0.25 mm (refer to FIG. 22).

Since melted material, at the time of welding, of the upper side case 10 and the lower side case 20 flows into gaps between the bottom 16a of the v groove 16 of the upper side case 10 and the outside inclined plane 25 of the inner peripheral wall 24 of the lower side case 20, a space between the inclined plane of the v groove 16 and the inside inclined plane 26 of the inner peripheral wall 24, and to the taper part 15a of the inside projecting bar 15 of the upper case 10, superfluous welding material scarcely protrudes to the inner face side of the battery case 2 (refer to FIG. 22).

Such welding is performed to the position where the upper end edge of the inner peripheral wall 24 of the lower side case 20 is melted by 0.25 mm in the height dimension, and since the inside face of the outer peripheral wall 14 of the upper side case 10 and the outside face of the inner peripheral wall 24 are brought in slide-contact with each other, the stepped difference part 11 is not generated between the face of the upper side case 10 and that of the lower side case 20, which means both the faces become approximately flush with each other, lending a good appearance (refer to FIG. 22).

In addition, forming of a welding portion of 0.25 mm for the width of the upper side case 10 and the lower side case 20 is sufficient in terms of intensity, and in the case of welding of more than that amount, melted material protrudes, lending a bad appearance.

Figure 14:
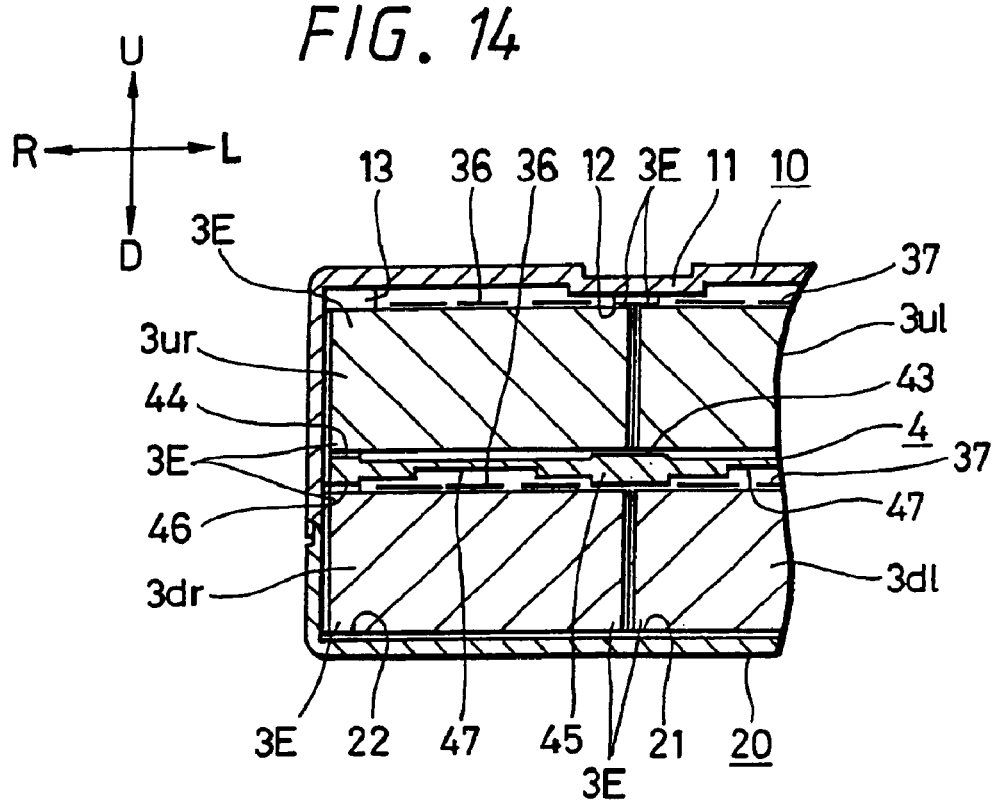
FIG. 14 is a cross-sectional diagram along an XIV—XIV line of FIG. 1, showing an expanded portion thereof.
Figure 15:
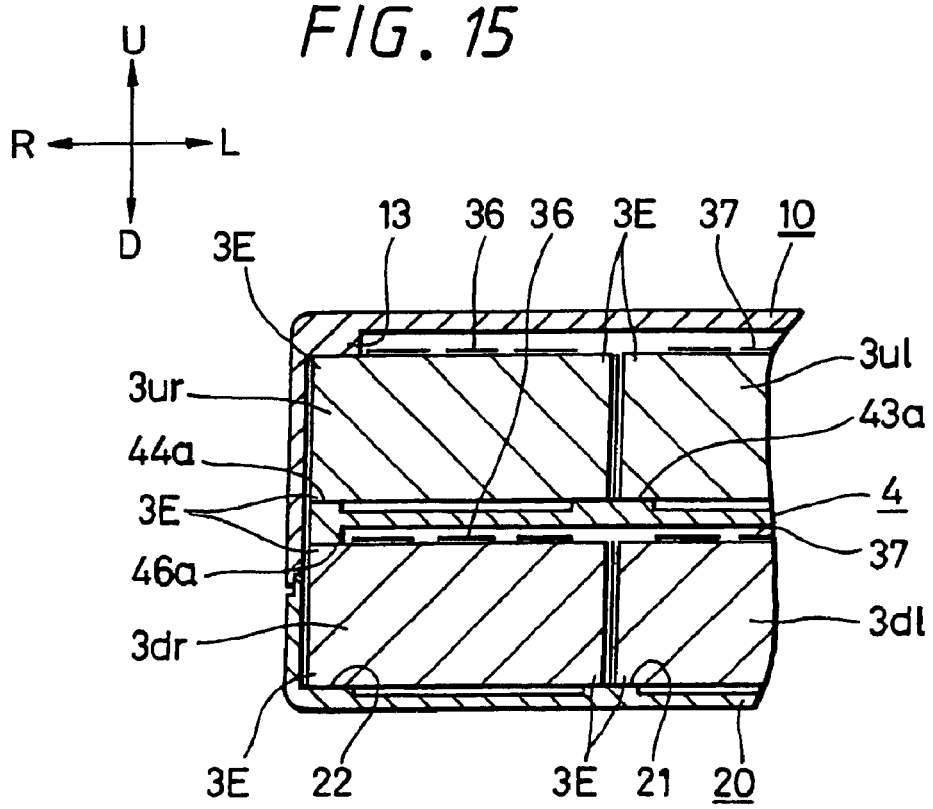
FIG. 15 is a cross-sectional diagram along an XV—XV line of FIG. 1, showing an expanded portion thereof.

Therefore, in the state of the four battery cells 3, 3, . . . being housed in the battery case 2, the left and right both side edge parts 3E, 3E of the respective battery cells 3, 3, 3, . . . become the state of being held between the battery case 2 and the separator 4, with gaps resultantly formed between the upper surface and the battery case 2, and between the under surface of the respective battery cells 3, 3, . . . and the separator 4 (refer to FIGS. 14 and 15).

Specifically, since the under surface side left and right both side edge parts 3E, 3E . . . of the upper side two battery cells 3ur, 3ul come in contact with the flat convex parts 43a, 43a, 44a, 44a respectively formed in the front and back both end portions of the three flat projecting bars (upper surface central flat projecting bar 43 and upper surface left and right flat projecting bars 44, 44) formed on the upper surface side of the separator 4 through the double-faced adhesive sheet 60, predetermined gaps are formed between the under surfaces of these upper side two battery cells 3ur, 3ul and the separator 4, and further, predetermined gaps are formed between the upper surface of these upper side two battery cells 3ur, 3ul and the above-mentioned inner side face of the upper side case 10 as the upper surface left and right both side edge parts 3E, 3E, . . . come in direct contact with the projecting part 12 provided to project approximately in the central portion of the inner side face of the upper side case 10 and the upper corner ribs 13 (refer to FIGS. 14 and 15).

The upper surface side left and right both side edge parts 3E, 3E, . . . of the lower side two battery cells 3dr, 3dl come in contact with the flat convex parts 46a, 46a, . . . through the double-faced adhesive sheet 60, that are formed at the both front and back end portions respectively formed in the under surface side central flat projecting bar 45 and the under surface side left and right flat projecting bars 46, 46 on the under surface side of the separator 4, with predetermined gaps being resultantly formed between the upper surface of these lower side two battery cells 3*dr*, 3*dl* and the separator 4. Further, with both the under surface side left and right side edges 3E, 3E thereof coming directly in contact with the small ribs 21, 21 formed approximately in the central portion of the lower inner side face and the lower corner ribs 22, 22, predetermined gaps are formed between the under surface of the lower side two battery cells 3*dr*, 3*dl* and the lower inner side face of the lower side case 20 (refer to FIG. 14, FIG. 15).

Particularly, the gaps between the upper surfaces sides of the respective battery cells 3, 3, . . . and the battery case 2 or the separator 4 are comparatively large, and in the gaps are positioned the above-mentioned negative pole side tab 37 and the intermediate connection tab 36. In spite of the negative pole side tab 37 and the intermediate connection tab 36 being positioned, further gaps can be had therebetween (refer to FIGS. 14 and 15).

Meanwhile, the contact between the respective side edge parts 3E, 3E, . . . of the above-mentioned battery cells 3, 3, . . . and the separator 4 is performed through the double-faced adhesive sheets 60, 61 as mentioned above.

The distance between the tips of the upper corner ribs 13, 13, . . . and those of the lower corner ribs 22, 22, . . . opposed to each other within the battery case 2 assembled as mentioned above and the dimensions in the height direction of the four battery cells 3, 3, . . . combined with each other through the separator 4 are formed to be the same or in the way that the height of the battery cells 3, 3, . . . is slightly larger. Consequently, in the state of the battery cells 3, 3, . . . being housed in the battery case 2, the respective double-faced adhesive sheets 60, 61 are slightly crushed so that the battery cells 3, 3, . . . do not become wobbly in the battery case 2.

Further, since the respective side edge parts 3E, 3E, . . . of the battery cells 3, 3, . . . are directly pressed by the projecting part 12 of the upper side case 10, the upper corner ribs 13 (side edge pressing part), the lower corner ribs 22 (side edge pressing part) and the small ribs 21 (side edge pressing part) of the lower side case 20, all provided in the inner side face of the battery case 2, the state of the battery cells 3, 3, . . . housed in the battery case 2 can be made free from play, so that the battery cells 3, 3, . . . can be stably held in the battery case 2.

Then, when the battery pack 1 is charged, since the battery can 31 of each of the respective battery 3, 3, . . . is shaped like a flat square solid, the central portions of the upper surface and the under surface thereof bulge out, but because of the above-mentioned gaps being formed between the respective battery cells 3 and the upper side case 10, the lower side case 20 or the separator 4, the amount of bulging of the battery cell 3 can be absorbed within the gaps, so that the whole of the battery case 2 never swells nor deforms (refer to FIGS. 16 and 18). In the meantime, the battery cells 3, 3, . . . shown in FIG. 16 and FIG. 18 by a continuous line indicate bulging states of the battery cell 3, 3, . . . and the battery cells 3, 3, . . . shown by a two-dot line indicate the states before bulging thereof.

Further, in the embodiments mentioned above, explanations have been given of the case in which by joining the upper side battery case 10 with the lower side battery case 20 in a way to cover the battery cells 3, 3, . . . , combination of them are performed by ultrasonic welding with the opening peripheral edges of the both in the state of being joined with other. However, the present invention is not limited thereto as the two may be combined with each other by using adhesive material.

In addition to this, the specific forms and structures of the respective portions shown in the above-mentioned embodiments are only one example for implementing the present invention, and therefore, the technological scope of the present invention should not be limitedly construed.

As is apparent from the descriptions made thus far, a battery pack of the present invention is a battery pack characterized by connecting in series and housing a plurality of square pole-like battery cells in a battery case, the battery case comprising a respectively box-like upper side case and lower side case joined with each other, the plurality of the battery cells having battery lids respectively positioned on the front side thereof and lining up in the left and right direction to be housed in the above-mentioned battery case; wherein there are provided a negative pole side tab extending to the battery lid side connected to the bottom of a battery can of a battery cell, an intermediate connection tab connecting a positive pole terminal part of the negative pole side battery cell to the bottom of a battery can of adjacent another battery cell and a positive pole side tab connected to a positive pole side terminal part of said another battery cell, the above-mentioned negative pole side tab and the intermediate connection tab being provided to creep over the side of the battery can of each of the respective battery cells by being respectively divided into two can bottom side tab and battery lid side tab, with PTC (positive temperature coefficient) interposed between these can bottom side tab and battery lid side tab; and further, a cell side insulating sheet is provided between the respective negative pole side tab, the intermediate connection tab and the side of each of the respective battery cans; and side edge pressing parts respectively are provided on the inner face of the upper side case and on the inner face of the lower side case to press the side edge portions extending in the front and back direction of the respective battery cells when the upper side case and the lower side case are combined with each other.

Therefore, according to a battery pack of the present invention, since the battery pack has provided in a battery case side edge pressing parts to press the side edge portions extending in the front and back direction of battery cells, the battery cells can be held without play when the battery cells are housed in the battery case, and predetermined gaps are formed between the central portion of the battery cells housed in the battery case and a separator; and when the battery cells swell at a time of the battery pack being charged and the central portions of the upper surface and the under surface bulge out, since the above-mentioned gaps can absorb the amount of bulging, it is possible to prevent the whole of the battery case from swelling and deforming.

According to the present invention, the above-mentioned negative pole side tab and intermediate connection tab are held between a cell side insulating sheet and another upper side insulating sheet attached to the upper side thereof, the negative pole side tab and intermediate connection tab are approximately fixed onto the upper surface side and disposed in such a way that they do not move easily. Consequently, even in the case where the battery case is accidentally dropped, there are no movements of the negative pole side tab and intermediate connection tab, thereby preventing the trouble in which they come in contact with a battery can.

According to the present invention, since a flank portion is provided in the above-mentioned cell side insulating sheet so that a side edge pressing part directly contacts with battery cells, it is possible to stably hold the battery cells.

According to the present invention, flank apertures are provided in the regions of the above-mentioned upper side insulating sheet, that correspond to the above-mentioned PTC, the amount of thickness of a can bottom side tab, PTC, a battery and lid side tab that are superposed up one on top of another can be absorbed, if only a little, thereby contributing to thinning of the thickness of a battery pack.

What is claimed is:

1. A battery pack in which a plurality of square pole-like battery cells are connected in series and housed in a battery case, characterized in that:

the battery case is comprised of a respective box-like upper side case and lower side case combined with each other, the plurality of the battery cells each have a battery lid respectively positioned on the front side thereof and are lined up in the left and right direction to be housed in said battery case, a negative pole side tab extending to the battery lid side connected to the battery can bottom of a battery cell, an intermediate connection tab connecting a positive pole terminal part of the battery cell to the battery can bottom of adjacent another battery cell, and a positive pole side tab connected to a positive pole side terminal part of said another battery cell are provided, said negative pole side tab and intermediate connection tab are provided to creep over the sides of the battery cans of the respective battery cells, said negative pole side tab and intermediate connection tab are respectively divided into two of a can bottom side tab and a battery lid side tab with PTC (positive temperature coefficient) interposed between these can bottom side tab and battery lid side tab, an insulating sheet (hereinafter, referred to as [cell side insulating sheet]) is provided between the respective negative pole side tab, intermediate connection tab and the sides of the respective battery cans; and side edge pressing parts are respectively provided on the inner face of the upper side case and on the inner face of the lower side case to press the side edge portions extending in the front and back direction of the respective battery cells when the upper side case and the lower side case are combined with each other.

2. A battery pack according to claim 1, wherein said negative pole side tab and intermediate connection tab are held between the cell side insulating sheet and another insulating sheet (hereinafter, referred to as [upper side insulating sheet]) attached onto the upper side thereof.

3. A battery pack according to claim 1, wherein a flank portion is provided in said cell side insulating sheet for the side edge pressing parts to directly come in contact with the battery cells.

4. A battery pack according to claim 2, wherein a flank portion is provided in said upper side insulating sheet for the side edge pressing parts to directly come in contact with the battery cells.

5. A battery pack according to claim 1, wherein flank apertures are provided in regions corresponding to said PTC of said upper side insulating sheet.

* * * * *